(12) United States Patent
Willard et al.

(10) Patent No.: US 10,198,880 B2
(45) Date of Patent: Feb. 5, 2019

(54) VEHICULAR DIAGNOSTIC SYSTEM

(71) Applicant: Lysanda Limited, Kelvedon, Essex (GB)

(72) Inventors: Alexandra Willard, Kelvedon (GB); Emmanouil Hatiris, Kelvedon (GB)

(73) Assignee: Tantalum Innovations Limited, Uxbridge, Middlesex (GB)

( * ) Notice: Subject to any disclaimer, the term of this patent is extended or adjusted under 35 U.S.C. 154(b) by 343 days.

(21) Appl. No.: 14/794,951

(22) Filed: Jul. 9, 2015

(65) Prior Publication Data

US 2016/0035157 A1 Feb. 4, 2016

Related U.S. Application Data

(60) Division of application No. 13/556,920, filed on Jul. 24, 2012, now Pat. No. 9,097,195, which is a
(Continued)

(30) Foreign Application Priority Data

Nov. 26, 2004 (GB) .................................. 0425964.4
May 23, 2005 (GB) .................................. 0510355.1
(Continued)

(51) Int. Cl.
*G07C 5/08* (2006.01)
*B60T 17/22* (2006.01)
(Continued)

(52) U.S. Cl.
CPC .......... *G07C 5/0808* (2013.01); *B60T 17/221* (2013.01); *F02D 41/0235* (2013.01);
(Continued)

(58) Field of Classification Search
CPC .. B60W 2540/30; B60W 40/09; B60W 40/00; B60W 10/06
See application file for complete search history.

(56) References Cited

U.S. PATENT DOCUMENTS 4,175,427 A    11/1979  Blanke
5,113,804 A *   5/1992  Kraus ..................... F02B 43/04
                                              123/1 A
(Continued)

FOREIGN PATENT DOCUMENTS

| EP | 0671617 | 9/1995 |
|---|---|---|
| EP | 0816820 | 1/1998 |
| EP | 1069422 | 1/2001 |
| GB | 2209854 | 5/1989 |
| GB | 2327511 | 1/1999 |
| GB | 2395565 | 5/2004 |

(Continued)

OTHER PUBLICATIONS

European Patent Office Search Report for Application No. GB0425964.4.
European Patent Office Search Report for Application No. GB0510355.1.

*Primary Examiner* — Redhwan K Mawari
(74) *Attorney, Agent, or Firm* — Crawford Maunu PLLC

(57) ABSTRACT

Apparatuses, systems and methods are implemented for characterizing one or more driver inputs. As may be relevant to one or more embodiments herein, particular aspects are directed to determining a driver input characteristic and using the determined input characteristic to assess a risk metric to the driver. In some implementations, the driver input characteristic is determined based upon a prediction of one or more of actual fuel used and torque. In some implementations, the prediction is determined in real-time and may be transmitted to a remote terminal for storage and/or analysis. The data for the prediction is obtained from
(Continued)

a vehicle diagnostic system, and is used to determine (e.g., predict and/or infer) information as presented by other vehicle systems to the vehicle diagnostic system, without necessarily communicating directly with the respective other vehicle systems. In various implementations, the driver risk characteristic is used for assessing an insurance-based risk metric.

22 Claims, 14 Drawing Sheets

Related U.S. Application Data continuation-in-part of application No. 13/422,641, filed on Mar. 16, 2012, now Pat. No. 8,843,263, which is a continuation of application No. 11/285,227, filed on Nov. 22, 2005, now Pat. No. 8,437,903, said application No. 13/556,920 is a continuation-in-part of application No. 13/262,203, filed as application No. PCT/GB2010/000664 on Apr. 1, 2010, now Pat. No. 9,836,574, said application No. 13/556,920 is a continuation-in-part of application No. 12/602,170, filed as application No. PCT/GB2008/001870 on May 30, 2008, now Pat. No. 8,364,339, said application No. 13/556,920 is a continuation-in-part of application No. 12/530,229, filed as application No. PCT/GB2008/000806 on Mar. 6, 2008, now Pat. No. 8,229,693.

(30) Foreign Application Priority Data

| Mar. 6, 2007 | (GB) | 0704377.1 |
| Jun. 1, 2007 | (GB) | 0710524.0 |
| Jun. 27, 2007 | (GB) | 0712521.4 |
| Apr. 2, 2009 | (GB) | 0905836.3 |

(51) Int. Cl.

| F02D 41/02 | (2006.01) |
| F02D 41/14 | (2006.01) |
| F02D 41/24 | (2006.01) |
| G07C 5/00 | (2006.01) |
| B60W 40/00 | (2006.01) |
| B60W 40/09 | (2012.01) |
| F01N 11/00 | (2006.01) |
| G01M 15/10 | (2006.01) |

(52) U.S. Cl.
CPC ..... *F02D 41/1495* (2013.01); *F02D 41/2403* (2013.01); *G07C 5/008* (2013.01); *B60W 40/00* (2013.01); *B60W 40/09* (2013.01); *B60W 2540/30* (2013.01); *F01N 11/00* (2013.01); *F02D 2200/606* (2013.01); *F02D 2250/36* (2013.01); *G01M 15/10* (2013.01); *G07C 5/085* (2013.01)

(56) References Cited

U.S. PATENT DOCUMENTS

| 5,431,042 | A |  | 7/1995 | Lambert et al. | |
| 5,572,424 | A | * | 11/1996 | Kellogg | G01M 15/102 701/33.7 |
| 5,583,765 | A | * | 12/1996 | Kleehammer | G01G 19/03 250/338.5 |
| 5,589,629 | A | * | 12/1996 | Quinn | G01M 15/108 73/118.01 |
| 5,750,886 | A |  | 5/1998 | Lambert et al. | |
| 5,797,134 | A | * | 8/1998 | McMillan | G06Q 30/0283 705/4 |
| 5,941,918 | A |  | 8/1999 | Blosser | |
| 6,053,151 | A | * | 4/2000 | Cook | F02M 25/0809 123/520 |
| 6,164,063 | A | * | 12/2000 | Mendler | F01N 3/2882 60/274 |
| 6,167,333 | A | * | 12/2000 | Gehlot | G08G 1/017 340/436 |
| 6,230,694 | B1 |  | 5/2001 | Cook et al. | |
| 6,295,492 | B1 |  | 9/2001 | Lang et al. | |
| 6,308,130 | B1 | * | 10/2001 | Vojtisek-Lom | G01M 15/10 701/114 |
| 6,366,207 | B1 | * | 4/2002 | Murphy | A61B 5/18 340/540 |
| 6,435,019 | B1 | * | 8/2002 | Vojtisek-Lom | G01M 15/108 73/114.31 |
| 6,438,472 | B1 | * | 8/2002 | Tano | G01C 21/26 701/25 |
| 6,594,579 | B1 | * | 7/2003 | Lowrey | G08G 1/20 340/439 |
| 6,595,043 | B2 | * | 7/2003 | Jaye | F02D 35/023 73/114.06 |
| 6,604,033 | B1 |  | 8/2003 | Banet et al. | |
| 6,868,386 | B1 | * | 3/2005 | Henderson | G06Q 30/0283 340/439 |
| 6,941,750 | B2 | * | 9/2005 | Boretto | F01N 3/035 55/DIG. 30 |
| 7,069,126 | B2 | * | 6/2006 | Bernard | B60K 35/00 340/438 |
| 7,263,433 | B2 | * | 8/2007 | Surnilla | F01N 11/002 60/276 |
| 8,229,693 | B2 |  | 7/2012 | Willard et al. | |
| 8,364,339 | B2 |  | 1/2013 | Willard et al. | |
| 8,437,903 | B2 |  | 5/2013 | Willard | |
| 2001/0025221 | A1 | * | 9/2001 | Klein | G08G 1/096827 701/424 |
| 2002/0078692 | A1 | * | 6/2002 | Jay | F02C 9/46 60/773 |
| 2002/0093201 | A1 | * | 7/2002 | Soucy | B60L 11/08 290/40 B |
| 2003/0032188 | A1 | * | 2/2003 | Bailey | B01D 53/9431 436/37 |
| 2003/0043073 | A1 | * | 3/2003 | Gray | G01S 5/0215 342/465 |
| 2003/0093217 | A1 | * | 5/2003 | Petzold | G01C 21/3484 701/411 |
| 2003/0136177 | A1 | * | 7/2003 | Hendren | G01N 33/0011 73/23.31 |
| 2004/0014564 | A1 | * | 1/2004 | Jager | B60W 10/02 477/115 |
| 2004/0034460 | A1 | * | 2/2004 | Folkerts | B60W 30/188 701/54 |
| 2004/0143378 | A1 | * | 7/2004 | Vogelsang | G01P 1/122 701/33.4 |
| 2004/0167689 | A1 | * | 8/2004 | Bromley | G07C 5/008 701/29.6 |
| 2005/0243936 | A1 | * | 11/2005 | Agrawala | H04W 64/00 375/259 |
| 2006/0116811 | A1 | * | 6/2006 | Willard | F02D 41/0235 701/109 |
| 2006/0155439 | A1 | * | 7/2006 | Slawinski | G07C 5/0858 701/33.4 |

(56) References Cited

U.S. PATENT DOCUMENTS

2013/0066512 A1* 3/2013 Willard ................ B60T 17/221
 701/29.1
2013/0096895 A1 4/2013 Willard et al.

FOREIGN PATENT DOCUMENTS

| GB | 2410560 | 8/2005 |
| GB | 2469122 | 10/2010 |
| WO | 9906681 | 2/1999 |
| WO | 0155690 | 8/2001 |
| WO | 03058188 | 7/2003 |
| WO | 2008107692 | 9/2008 |
| WO | 2008146020 | 12/2008 |
| WO | 2010112872 | 10/2010 |

* cited by examiner

VEHICULAR DIAGNOSTIC SYSTEM

RELATED PATENT DOCUMENTS

This patent document is a divisional under 35 U.S.C. § 120 of U.S. patent application Ser. No. 13/556,920 filed on Jul. 24, 2012 (U.S. Pat. No. 9,097,195), which is a continuation-in-part of U.S. patent application Ser. No. 13/422,641 filed on Mar. 16, 2012 (U.S. Pat. No. 8,843,263) and entitled "Vehicular Diagnostic System," which is a continuation of U.S. patent application Ser. No. 11/285,227 filed on Nov. 22, 2005 (U.S. Pat. No. 8,437,903), which claims the foreign priority benefit under 35 U.S.C. § 119/365 of United Kingdom Patent Application No. GB0425964.4 filed on Nov. 26, 2004, and of United Kingdom Patent Application No. GB0510355.1 filed on May 23, 2005; U.S. Ser. No. 13/556,920 (U.S. Pat. No. 9,097,195) is also a continuation-in-part under 35 U.S.C. § 120 of U.S. patent application Ser. No. 13/262,203 filed on Apr. 17, 2012 (U.S. Pat. No. 9,836,574) and entitled "Vehicle Management Devices," which is the national stage filing under 35 U.S.C. § 371 of International Application No. PCT/GB2010/000664 filed on Apr. 1, 2010, which claims foreign priority benefit under 35 U.S.C. § 119/365 of United Kingdom Patent Application No. GB0905836.3 filed on Apr. 2, 2009; U.S. Ser. No. 13/556,920 (U.S. Pat. No. 9,097,195) is also a continuation-in-part under 35 U.S.C. § 120 of U.S. patent application Ser. No. 12/602,170 filed on Nov. 30, 2009 (U.S. Pat. No. 8,364,339) and entitled "Engine Monitoring," which is the national stage filing under 35 U.S.C. § 371 of International Application No. PCT/GB2008/001870 filed on May 30, 2008, which claims foreign priority benefit under 35 U.S.C. § 119/365 of United Kingdom Patent Application No. GB0710524.0 filed on Jun. 1, 2007 and of United Kingdom Patent Application No. GB0712521.4 filed on Jun. 27, 2007; and U.S. Ser. No. 13/556,920 (now U.S. Pat. No. 9,097,195) is also a continuation-in-part under 35 U.S.C. § 120 of U.S. patent application Ser. No. 12/530,229 filed on Sep. 8, 2009 (U.S. Pat. No. 8,229,693) and entitled "Calibration Tool," which the national stage filing under 35 U.S.C. § 371 of International Application No. PCT/GB2008/000806 filed on Mar. 6, 2008, which claims foreign priority benefit under 35 U.S.C. § 119/365 of United Kingdom Patent Application No. GB0704377.1 filed on Mar. 6, 2007; to each of which benefit is claimed and which are fully incorporated herein by reference.

FIELD OF THE INVENTION

The present invention relates to systems for determining an accurate prediction of actual fuel used by a vehicle engine, and in particular to onboard systems for real-time determination of fuel used.

BACKGROUND OF THE INVENTION

It is well known that vehicle exhaust gases are a cause of environmental pollution. The gaseous pollutants are commonly subdivided into four broad categories: Hydrocarbons (NC), Oxides of Nitrogen (N0x), Carbon Monoxide (C0) and Carbon Dioxide (C02). Additionally, the exhaust gases comprise very small particulates (referred to as PM10s) of solid matter which have a significant effect on air quality. In North America and Europe legislation provides limits for the mass of each type of pollutant that is emitted when the vehicle is driven over a standard drive-cycle. The standard drive cycle is intended to be broadly representative of how vehicles are actually used (see for example, the Urban Dynamometer Driving Cycle from US Federal Test Procedure 72).

The emissions testing procedure cannot be expected to characterize a vehicle's emissions under all conceivable driving conditions. The standard drive cycles have been designed to be as representative as possible whilst still being a viable basis for an emissions test. Specific legislation exists in both North America and Europe to prohibit manufacturers from calibrating their engine control systems so that a significant increase in tailpipe emissions occurs when the vehicle is operating at speeds and loads not on the standard drive-cycle. This may be desirable as increased performance can be obtained from the vehicle if emissions are deliberately degraded.

The manufacturers are allowed to degrade a vehicle's emissions in order to protect the engine or emission control equipment fitted to the engine and a specific example of this is high load enrichment on spark-ignition (SI) engines. The speeds and accelerations required by this test are easily achievable by a modern vehicle and at no point does the engine get close to full load. At full load, depending on calibration, the SI engine can be operating at an air-fuel ratio that is richer than the stoichiometric ratio (normally to protect the exhaust valves). When the engine is running rich, catalyst conversion efficiency is dramatically reduced and HC and CO emissions increase considerably. Additionally, there are defined windows for each gear change on the drive-cycle that last about two seconds. In practice a gear change can be performed quicker than this. Gear changes, especially fast ones, normally result in the engine being unable to control accurately the air-fuel ratio during these rapid transients. Inaccurate control of the air-fuel ratio results in poor catalyst conversion and consequently increased emissions of HC, NOx and C0.

FIG. 1 shows a graphical depiction of the post catalyst pollutant mass of both hydrocarbons (Line A) and N0x (Line B) as the air-fuel ratio (AFR) is varied. For fuel rich AFRs the HC emissions rise sharply and the N0x emissions are low. For fuel lean AFRs, the N0x emissions rise and the HC emissions are low. When there is a stoichiometric AFR then the N0x and HC emissions are equal and at a relatively low level.

Compression-ignition (CI) engines are capable of running at a wide range of air-fuel ratios. In a CI engine, the air-fuel ratio is varied in order to vary the torque output of an engine. SI engines use a throttle to restrict the mass of air inducted into the engine to achieve the same torque reduction effect. The emissions of HC, N0x and C0 are related to the air-fuel ratio and injection timing being used for a CI engine. Richer mixtures tend to result in lower temperature and incomplete combustion, resulting in increased HC and CO emissions.

Injection timing also has an effect on the level of emissions. A CI engine has an optimum injection angle for efficiency, although emissions considerations may force the controller to deviate from the optimum. Injection timing affects the peak temperature achieved during combustion. At high combustion temperatures, atmospheric nitrogen is fixated and N0x emissions arise. Other factors, such as instantaneous catalyst conversion efficiency, the use of exhaust gas recirculation (EGR), time since start and particulate trap state also affect tailpipe emissions on SI and/or CI engines. Considering this range of factors, it can be seen that there are many modes of driving which generate more pollutants than the figures predicted by standard drive cycles.

Further to the standards for vehicle emissions over a defined drive cycle, the engine control system on a vehicle must also monitor the performance of emissions control equipment. If a fault is detected in the emissions control equipment that could result in an increase in tailpipe emissions, the engine controller warns the driver by illuminating a "check engine" lamp on the instrument cluster. This lamp is referred to as the "malfunction indicator lamp" and the driver is expected to take the vehicle for service if the lamp becomes illuminated. In order to detect these faults, the engine controller contains a suite of diagnostics (OBD) software that monitors engine performance. The OBD standard also specifies a protocol that allows proprietary software tools to interrogate the engine controller. This interface allows access to fault codes that are stored inside the engine controller. OBD must also support the reporting of real-time measurements made by the engine controller, such as engine speed, calculated load, etc.

As part of the homologation process for a new vehicle, it will be subjected to an emissions test, during which a driver will be required to control the vehicle's speed to a set point as determined by the drive cycle. Exhaust gases from the vehicle are stored in a bag which is subdivided into a number cells, which allows a small gas sample to be collected once a second on the drive cycle, At the end of the test, the gas samples are analyzed to determine the mass of HC, $NO_R$, CO and $CO_2$ in each sample. The equipment used to perform the gas analysis is bulky (usually one wall of a large room) and this technology is not suitable for on-vehicle processing of emissions.

Alternative measurement techniques are now available: Fast NO and HC sensors have been developed (for example by Cambustion in the UK) and allow instantaneous measurement of pollutant mass. This equipment is expensive and still relies on bottled reference gases, rendering this technology unsuitable for use for on-vehicle emissions testing. $Fast_{NO}$ sensors, suitable for on-vehicle use, are in development for advanced Diesel emissions control systems but this technology is not yet mature. An equivalent HC sensor is not currently available and the cost of retro-fitting these sensors to a vehicle and interfacing them to the emissions control systems will still be high.

A known technique is disclosed by U.S. Pat. No. 6,604,033, in which a system is provided that uses exhaust gas sensors and data provided by an onboard diagnostic system to determine the emissions of a vehicle and whether or not they meet a regulatory threshold. The most significant disadvantage of the system disclosed in U.S. Pat. No. 6,604,033 is that the exhaust gas sensors are expensive and will need to be installed to each vehicle for which the emissions are to be measured.

SUMMARY OF THE INVENTION

According to the present invention there is provided an apparatus for measuring the emissions produced by a vehicle, the apparatus comprising: an emissions unit, a vehicle diagnostic system, and one or more vehicle systems, wherein: the vehicle diagnostic system being in direct communication with the one or more vehicle systems and, in use, receiving vehicle data from the one or more vehicle systems; the emissions unit, in use, receiving diagnostic data solely from the vehicle diagnostic system; and the system, in use, determines the emissions produced by a vehicle using the diagnostic data received by the emissions unit.

The advantage of the present invention is that the vehicle emissions can be determined without needing to access any of the vehicle's systems and only requires access to the diagnostic system of the vehicle. This provides an apparatus that enables the vehicle emissions to be determined that is cheaper to install, cheaper to operate and more reliable than the system disclosed in U.S. Pat. No. 6,604,033.

BRIEF DESCRIPTION OF THE DRAWINGS

The invention will now be described, by way of example only, with reference to the following Figures in which.

DETAILED DESCRIPTION

Figure 1:
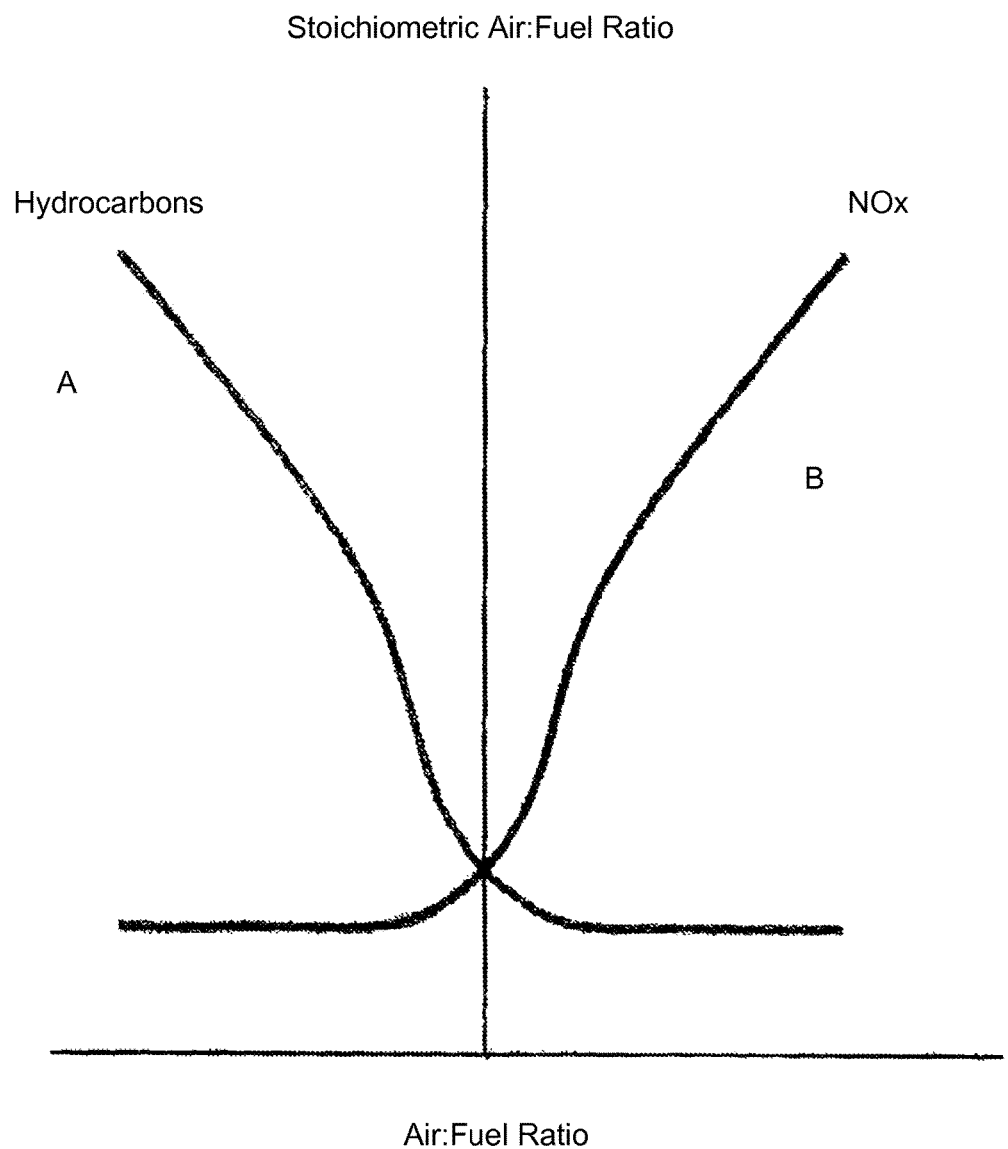
FIG. 1 shows a first view of a graphical depiction of the post catalyst pollutant mass of both hydrocarbons and NOx as the air-fuel ratio is varied.
Figure 2:
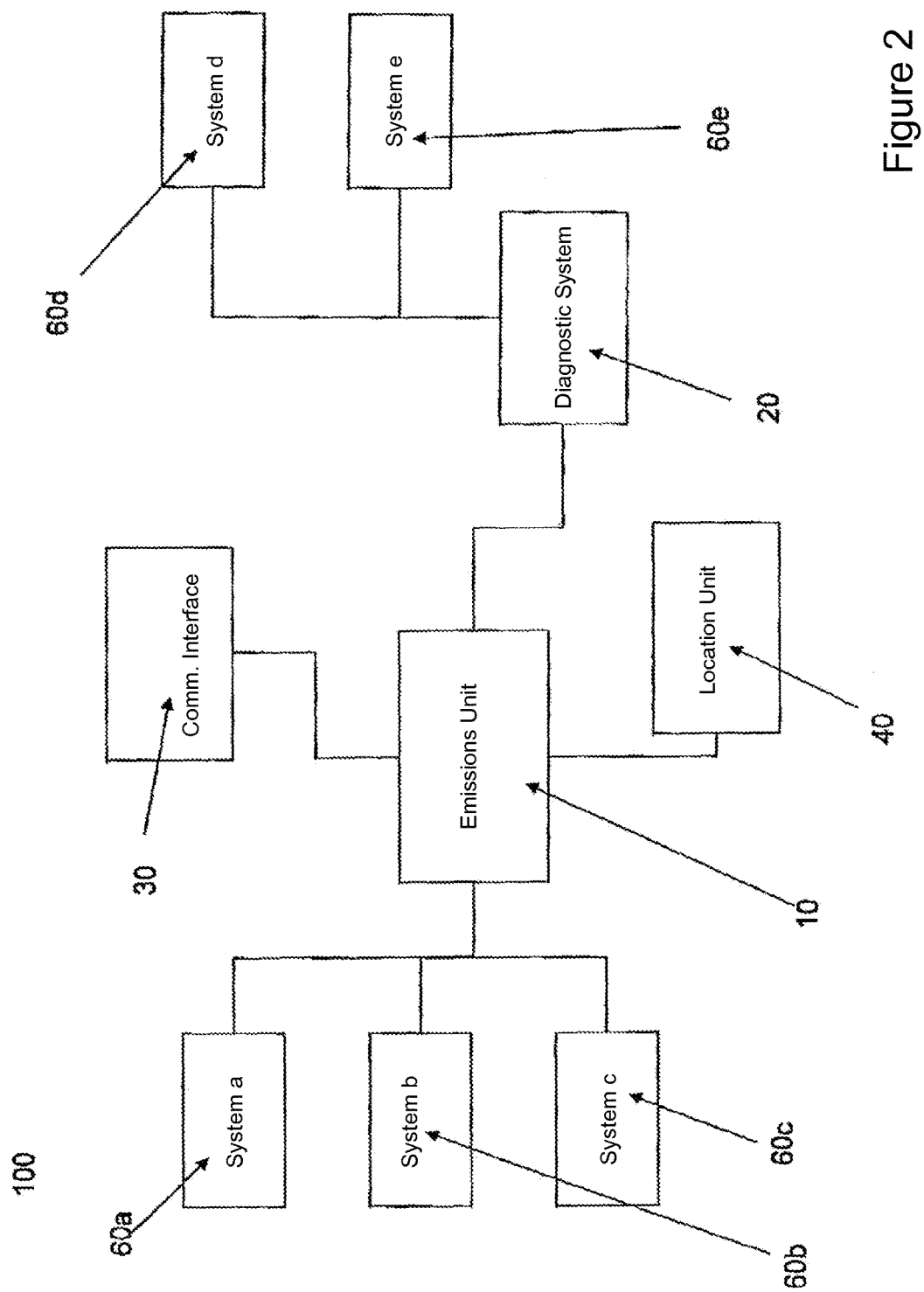
FIG. 2 shows a schematic depiction of a system according to the present invention under calibration.

FIG. 2 shows a schematic depiction of a system 100 according to the present invention under calibration. The system comprises emissions unit 10, vehicle diagnostic system 20, communications interface 30, vehicle location unit 40 and a plurality of vehicle systems and subsystems 60a, 60b, . . . . The emissions unit 10 is connected to the vehicle diagnostic system, which may be for example, the 013D or 0130-11 system. The emissions unit 10 is also connected directly to a plurality of vehicle systems and sub-systems, for example to monitor the engine temperature. This enables additional data to be measured which cannot be received directly from the vehicle diagnostic system or to provide a check against the data being provided by the vehicle diagnostic system. The emissions unit is also connected to the communications interface 30 and the vehicle location unit 40 (see the discussion which follows).

When under calibration, the vehicle emissions are measured using conventional methods across a wide range of engine speeds and loads, environmental conditions, etc., and the data received from the vehicle diagnostic system and directly from the plurality of vehicle systems and sub-systems is also recorded. These data sets can then be correlated so that in use, the vehicle emissions can be determined solely on the basis of the data received from the vehicle diagnostic system.

Figure 3:
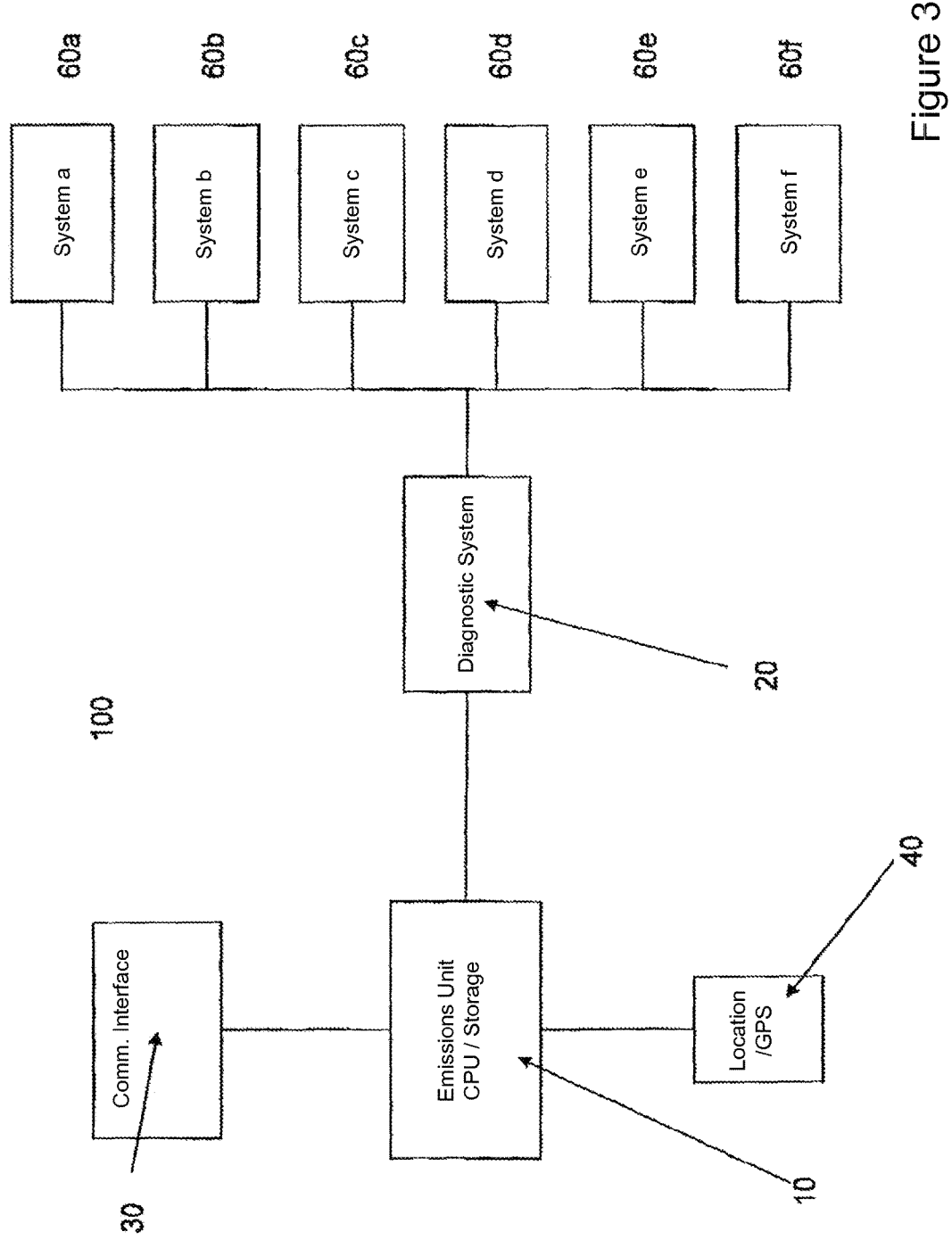
FIG. 3 shows a schematic depiction of a system according to the present invention in use within a vehicle.

FIG. 3 shows a schematic depiction of a system according to the present invention in use within a vehicle. The system comprises emissions unit 10, vehicle diagnostic system 20, communications interface 30, vehicle location unit 40 and a plurality of vehicle systems and sub-systems 60a, 60b, . . . . In use the system is configured differently to the system disclosed in FIG. 2 in that the emissions unit 10 has a direct connection to the vehicle diagnostic system 20 which is in turn connected to the of vehicle systems and sub-systems 60a, 60b, . . . . There is no connection between the emissions unit 10 and the vehicle systems and subsystems 60a, 60b, . . . .

In use, the emissions unit receives data solely from the vehicle diagnostic system and the vehicle emissions can be determined by the emissions unit in accordance with the data received from the vehicle diagnostic system. The vehicle emissions may be directly calculated based on the data received from the vehicle diagnostic system, one or more inferences of a vehicle state or parameter may be made based on the received data and the vehicle emissions determined based on the inferences and/or one or more data values, or the emissions value(s) may be determined from accessing a look-up table. The emissions unit comprises a processing unit, such as a CPU, that interprets the data received by the emissions unit from the vehicle diagnostic system and determines the vehicle emissions. The emissions unit further comprises data storage means, and preferably both volatile and non-volatile data storage means, for storing data received from the vehicle diagnostic system and determined vehicle emissions values.

The emissions unit is also connected to a vehicle location unit 40, which may be a GPS receiver or a mobile phone receiver, that determines the position of the vehicle. The position data can be fed to the emissions unit and used to correlate data received from the vehicle diagnostic system, for example validating the speed or distance traveled by the vehicle. The communications interface 30 may be used by the emissions unit to transfer emissions data and/or the parameters used to determine the emissions data. The data can be downloaded to a remote terminal that analyses the emissions data, driving style of the driver, routes traveled, etc., such that the usage of the vehicle can be monitored and appropriate feedback passed on to the driver. The communications interface may be a mobile telephone interface, for example using GSM, GPRS or 3G technologies to transmit the data. Other suitable communication technologies may be alternatively or additionally used.

Figure 4:
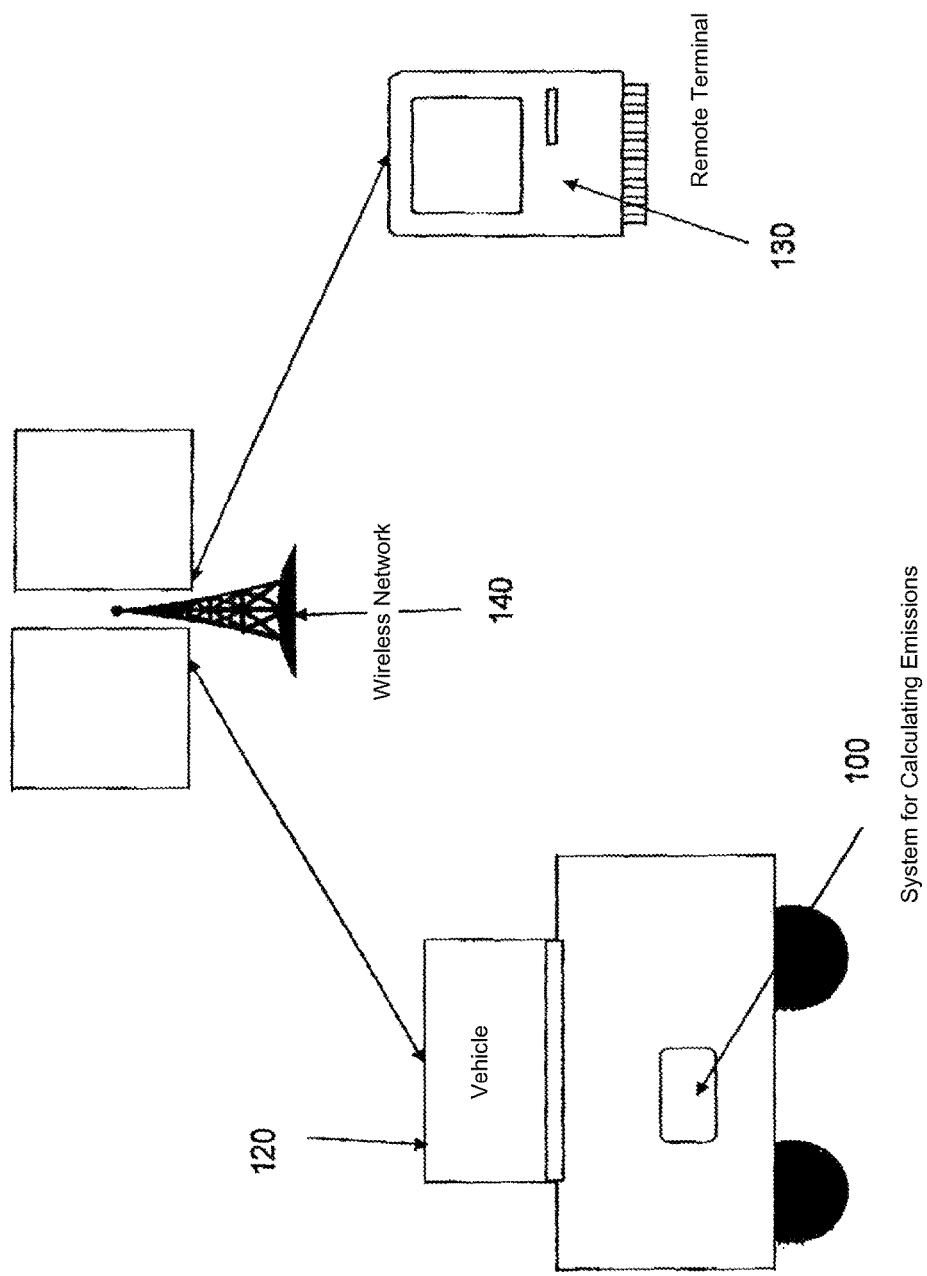
FIG. 4 shows a schematic depiction of an alternative embodiment of the present invention.

FIG. 4 shows a schematic depiction of an alternative embodiment of the present invention. Vehicle 120 comprises a system 100 according to the present invention, substantially as described above with reference to FIG. 3. The system 100 further comprises a remote terminal 130 which is in communication with emissions unit 10 via the communications interface 30 and wireless communications network 140. In this alternative embodiment, some or all of the determination of the vehicle emissions is performed by the remote terminal; for example the emissions unit may send the data received from the vehicle diagnostic system directly to the remote terminal for the remote terminal to determine the vehicle emissions. Alternatively, the emissions unit 10 may perform some of the processing required to determine the vehicle emissions and then pass the data to the remote terminal to perform the rest of the data processing. The remote terminal may also store the vehicle emissions for subsequent analysis, along with the driving style of the driver, routes traveled, etc. such that the usage of the vehicle can be monitored and appropriate feedback passed on to the driver. The emissions unit 10 may store a data set in the data storage means and then the data set transmitted to the terminal at an appropriate interval. Alternatively, data may be transmitted to the remote terminal when it is received by the emissions unit.

The wireless communications network may be a mobile telephone network, for example using GSM, GPRS or 3G technologies to transmit the data. It will be understood that a remote terminal may be connected to the wireless network via one or more fixed networks. The remote terminal is stationary and located external to the vehicle but the term 'remote' need not mean that the terminal is a long distance from the vehicle. For example, the remote terminal may be sited in a garage or workshop and a Bluetooth® or WiFi® network used to provide the wireless communication between the system and the terminal. It will be readily understood that other suitable communication technologies may be alternatively or additionally used.

Vehicle manufacturers go to considerable effort to calibrate the on-board diagnostics software inside the engine controller and thus the control software implemented inside a controller is a very accurate model of engine performance. Thus the present invention uses data obtained from OBD for the determination of the vehicle emissions. If additional information is required then it will be necessary to add sensors to vehicle components or systems or to extract signals from one or more vehicle systems or the wiring loom of the vehicle. This will lead to an increase in cost and complexity for the system.

The vehicle diagnostic system can report data for a number of different vehicle parameters, such as, for example, vehicle speed, engine speed, throttle angle, engine temperature, etc. Further information regarding OBD systems and capabilities can be found in documentation provided by the United States Environmental Protection Agency. The emissions unit may receive data from, for example, a temperature sensor measuring the temperature of a catalytic converter (for spark ignition engines, see below), powertrain components, ignition systems etc. It will be readily understood that the sophistication and complexity of the model used to determine vehicle operational characteristics such as vehicle emissions will in part be determined by the type and number of parameters that are used as inputs to the model.

Spark Ignition Engines

Determining the emissions from SI engines relies on a set of key parameters being known or estimated. Wherever possible an engine controller will operate an SI engine at a stoichiometric air-fuel ratio (AFR) under closed loop control. The OBD interface reports whether fuelling is currently closed or open loop, but a report of the actual AFR is not guaranteed by the OBD standard. In the event that a particular implementation of the OBD standard does not include a report of the actual AFR then an estimation or inference of the ratio must be made. Tables 1 and 2 below show some of the factors that will be used to determine an open loop AFR:

TABLE 1

| Reasons for a rich AFR | Primary measurement method |
| --- | --- |
| Warm-up | Estimate using coolant temperature from OBD port |
| Catalyst/engine protection | Estimate using engine load from the OBD port and measured data from a reference vehicle |
| Driveability | Estimate from engine load and data from a calibration exercise |
| Exit from over-run fuel shutoff | Estimate from engine load, calibration data and the closed loop fuelling flag |
| Fault conditions | Determine from malfunction indication on OBD |
| Aged components | Estimate from durability measurements on the reference vehicle and open loop fuelling flag from OBD |
| Poor transient control | Estimate from load and measurements on the reference vehicle |
| Deliberate perturbation for diagnostics tests | Infer from diagnostics monitor status, reported over the OBD link |

TABLE 2

| Reasons for a lean AFR | Primary measurement method |
| --- | --- |
| Fast catalyst light-off | Determine from closed loop fuelling flag, time since start and coolant temperature |
| Fault conditions | Determine from malfunction indication on OBD |
| Aged components | Estimate from durability measurements on the reference vehicle and open loop fuelling flag from OBD |
| Poor transient control | Estimate from load and measurements on the reference vehicle |
| Special operating modes | Examples are over-run fuel shut-off and cylinder cutout for rev or torque limiting |

A modern three-way catalytic converter must have a high temperature in order to convert HC and NO into H20, CO2 and N2 and the conversion efficiency is dependent on a number of factors (see Table 3) below:

TABLE 3

| Reasons for reduced conversion efficiency | Primary measurement method |
| --- | --- |
| Temperature | Estimate from load (OBD), time since start, engine temperature (OBD), air-fuel ratio (estimated by the model) and ignition advance (OBD). It is believed that this estimation technique may lack the required accuracy and thus it may be necessary to directly measure this parameter |
| AFR history | A catalyst can be regarded as an oxygen storage device. When a large amount of oxygen has been stored in the catalyst, it will be most efficient at HC and CO conversion. When little oxygen is stored in the catalyst, it will be more efficient at $NO_x$ conversion. The history of the estimated AFR will be used to compute conversion efficiency. |
| Catalyst age | A brand new catalyst does not exhibit the same conversion efficiency properties as one that has been fitted to a vehicle that has covered several thousand miles. A new catalyst will have unpredictable oxygen storage properties and measurements across a range of reference vehicles will be used to correlate conversion efficiency with vehicle age. |

Once the conversion efficiency and current AFR are known, the HC, CO and NO emissions can be determined.

Compression Ignition Engines

Figure 5:
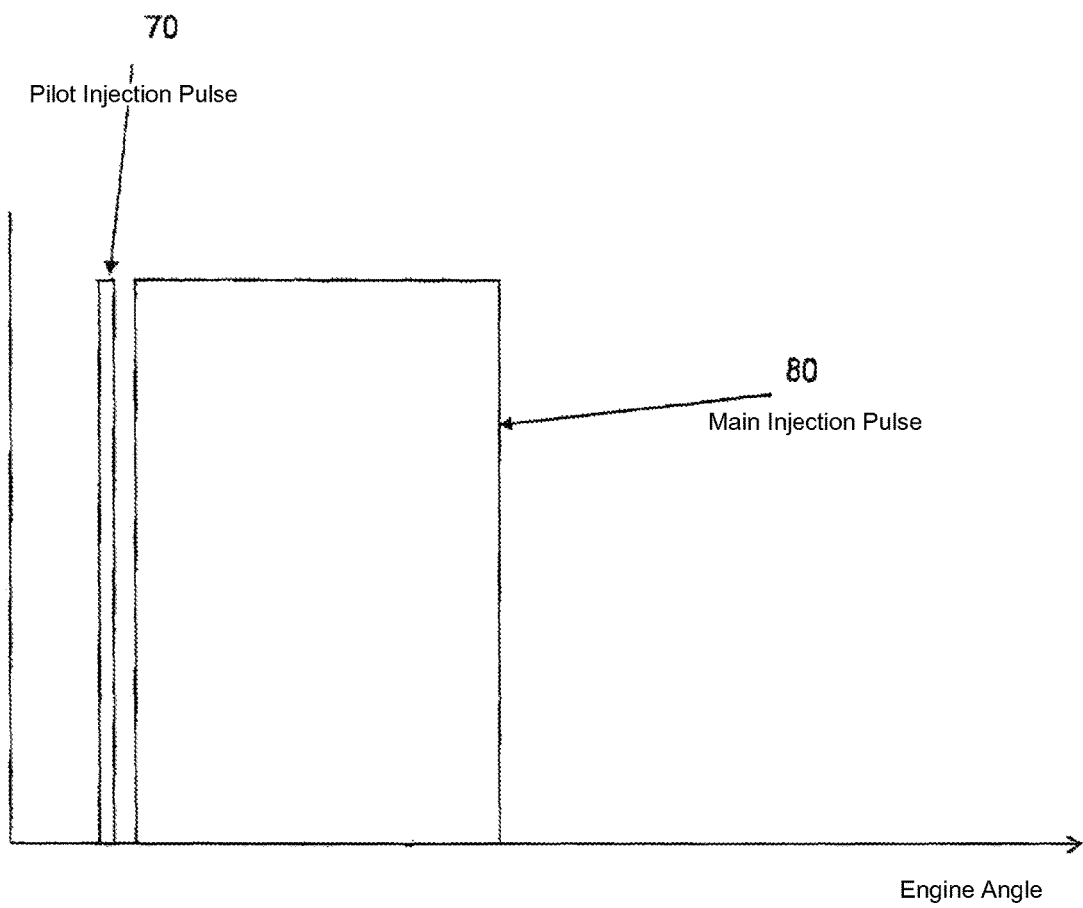
FIG. 5 shows a graphical depiction of the multiple injection pulses used with a modern Diesel engine.

It is anticipated that CI engines will require direct monitoring of the injection pulse sequences and timing to determine accurately the emissions (this monitoring will typically be carried out in addition to the measurement and monitoring steps described above with reference to spark-ignition engines). Detailed injector pulse data is not available over OBD and will therefore have to be directly measured with accurate pulse timing being required if useful emissions data is to be calculated. FIG. 5 shows a graphical depiction of typical Diesel injection multiple pulses as used for, or with, a modern engine. Typically a short duration pilot injection 70 is followed by a main injection 80 having a much greater duration. A software or hardware timer may be used to capture the pulse duration. The measurement of the engine angle at which the pulse occurs requires timing against a pulse from a known reference point on the engine. An electronically controlled CI engine will typically have Hall effect or variable reluctance sensors connected to the engine camshaft and crankshaft. These sensors are used by the CI engine controller to schedule fuel injection and it may be possible to use non-invasive inductive coupling to sense the injector activity. Other sensing techniques which may be used include, without limitation, single- or multiple-axis accelerometers, serial connections, probes and pump sensors.

It is common for modern CI engines to use exhaust gas recirculation (EGR) to reduce $NO_x$ emissions. It is proposed to estimate the amount of EGR being used, although direct measurement may alternatively be performed. Testing can indicate which approach is to be preferred for different vehicle types. Table 4 indicates some factors that influence the amount of EGR commanded by a typical control strategy:

TABLE 4

| Input variable | Primary measurement method |
| --- | --- |
| Engine load | Available over OBD |
| Engine speed | Available over OBD or direct measurement from injection sensing |
| Engine temperature | Available over OBD |
| Air charge temperatures | Available over OBD |
| Inducted air mass | Available over OBD |
| Time since start | Calculated internally by the system |

The models for both spark- and compression-ignition engines will allow an accurate prediction of actual fuel used, independent from any calculations done inside the engine controller. However, vehicle emissions are known to be strongly dependent upon driver performance and thus a number of different driver behaviors can be measured or inferred, such as, for example:

Time spent at or close to full load—minimizing full load operation reduces a vehicle's emissions.

Time spent at high loads when the engine is cold—this leads to increased emissions.

Time spent in top gear at light loads—lower gears result in increased fuel usage and emissions for a given mileage.

Time spent with engine running and vehicle stationary.

Number of short journeys.

Thus it is possible to determine what the effect of the driving style an individual driver has on the emissions of their vehicle. This enables driver training to be provided as appropriate.

In accordance with one or more example embodiments, on-board diagnostics of a vehicle are used to provide access to numerous data from the Engine Control Unit (ECU). Each variable is obtained from the ECU via a controller area network, and each variable that is being logged is assigned a unique parameter identity (PID). There are a number of standard PIDs, such as those for engine speed and calculated engine load, which every engine is required to support. These are referred to as Mode 1 PIDs and are defined, along with their message format, by ISO 15031-5.

There are also different types of PIDs, known as mode 22 PIDs, which are manufacturer specific and have their message format defined by the Unified Diagnostics (UDS) protocol. Because mode 22 PIDs vary from manufacturer to manufacturer, non-industry standard PIDs as scanned, their properties are studied and a decision is made as to what their function is when compared with expected values for certain variables. The parameter ID (PID) lies within a given address range, with other details left to specific applications (e.g., determined by the manufacturer of the vehicle in which the apparatus/system is implemented). Therefore the manufacturer may use any PID within the range to represent any particular sensor's data and may scale that data in any way. Some PIDs are also used to represent state information and may therefore be bit-mapped rather than a representing a single piece of data.

A calibration tool scans through a range of data and requests each PID in turn to identify which PIDs are supported on a particular vehicle, and what size of data is returned for each. Unsupported PIDs receive a fixed response according to the protocol. However there may still be a list of 50 or more supported PIDs, certain ones of which (e.g., ten or more) are identified for obtaining data for estimating driver behavior.

The system requests PIDs at regular intervals as the vehicle is driven. During this time, the system also runs a mathematical model of the engine, given the basic information from the Mode 1 PIDs to ensure that the model tries to emulate the same operation as the real engine. The model predicts the value of the PID that is being requested and the system compares the model with the PID value returned. The system attempts to statistically correlate the model data with the PID value to determine if this PID contains data from the sensor in question. A measure of confidence is built up over time. If the confidence measure becomes either extremely high or extremely low, then the PID is recognized as definitely the same or definitely different to the model value and therefore can be used or ignored.

Figure 6:
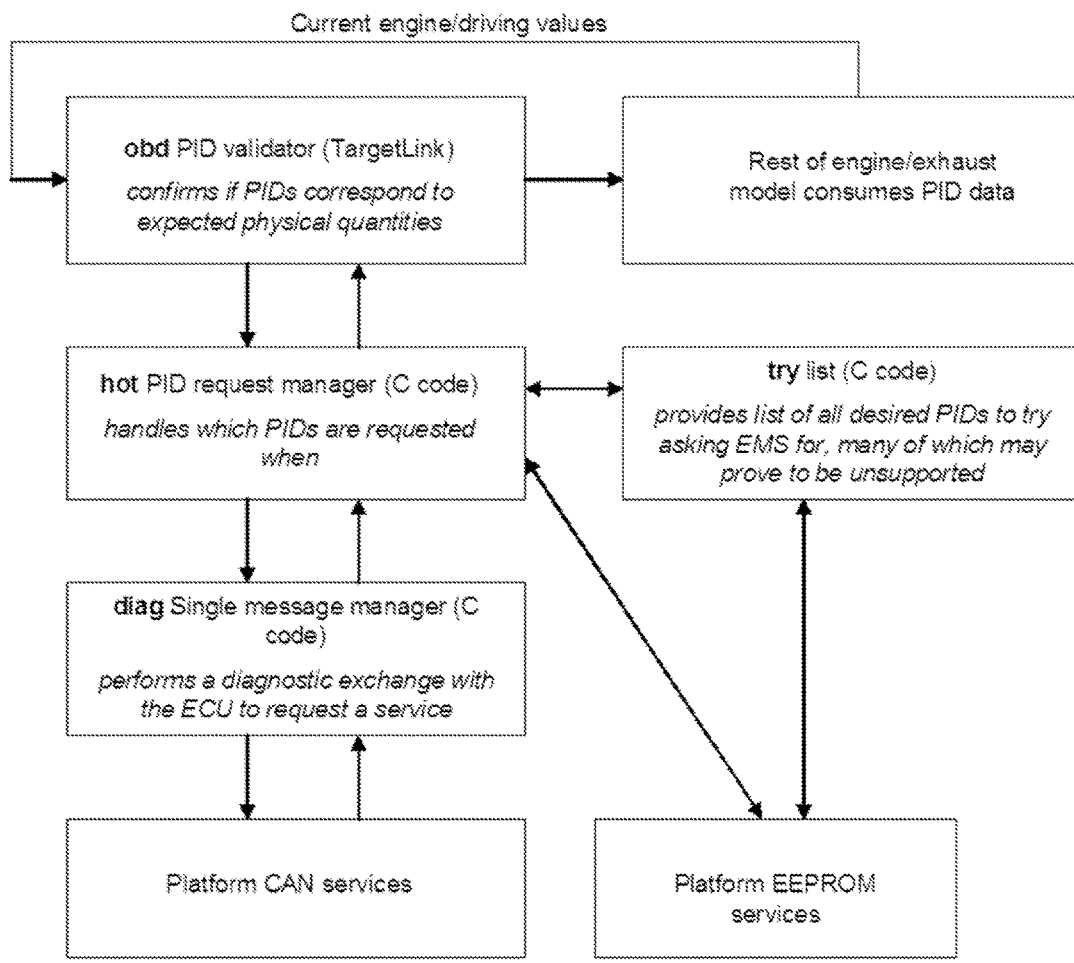
FIG. 6 illustrates an overview of a process of parameter indication (PID) validation, in accordance with another embodiment.

FIG. 6 illustrates an overview of a process of PID validation, in accordance with another embodiment. A single message manager reads messages from a controller area network to extract data from an ECU. A "try list" is maintained, which is a list of the likely PID values which are used by the vehicle ECU. This list may be the variables known to be used by a given manufacturer, a specific list for the particular vehicle or the PID request manager may simply loop through all the possible PID address values. PID requests are made to the ECU and each time a positive response occurs, the PID is written into a "hotlist" of PIDs which are candidates for the variables required. An example format for the hot-list is shown in Table 5.

For each PID, a record structure including the information in Table 5 is kept. In addition to fields used for internal debugging, fields used in validation (e.g., a timestamp) are used to allow the validation process to know how long the PID has been active on the hotlist and a validity_data field, known as the "PID bit-field". Before a PID has been validated, it stores the roles that the PID may represent. Each role has an ID and every role for which the PID is being considered is stored in the PID bit-field. After the PID has been validated, it stores the role that the PID represents. When a PID is linked to a role, the role ID is removed from the PID bit-fields of all the other PIDs. An example set of data stored for each PID is shown in Table 6.

TABLE 6

| U16 pid | The PID ID (0x00-0xFFFF) that has been retrieved |
| --- | --- |
| U16 bytes_rxd | The number of bytes received (or which the EMS wished to reply with); 0xFFFF in error |
| U32 latest_value | The most recent value retrieved |
| U32 min_value | The lowest recorded value so far |
| U32 max_value | The highest recorded value so far |
| U32 filt_value | Filtered average value |
| U32 validity_data | Used by calling code to track status of this PID in validation process; top bit set if a PID is confirmed in a particular role, and the hot module initializes all bits to 1 except that top bit. |
| U32 first_timestamp | Time this PID value was first obtained; zero is never. Re-initialized to zero on PIM start-up. |
| U8 raw_data[8] | (Internal 'hot' debug use only.) |
| U8 rate | One of HOT_RATE_SLOW, etc. |
| U8 deleted | (Internal 'hot' use only.) |

A mathematical model is provided for each of the desired PIDs. The model provides expected mean values of the variable associated with the PID, and expected extreme values. For example, the measurement of the "desired fuel", which is the target level of fuel which the ECU wishes to inject, is one of the reported variables, which may be mode 22 (i.e., manufacturer specific). In order to determine its PID from amongst the PID values obtained from the OBD, the behavior of each PID is observed and compared with expected behavior of desired fuel. This behavior will have the following patterns:

(i) When the vehicle is decelerating in gear with zero load, then no fuel will be injected, i.e. the desired fuel will be equal to zero.

(ii) When the vehicle speed and load are high, then the desired fuel will also be high. Since in a diesel vehicle the injected fuel quantity determines the torque, when the torque is high, so is the desired fuel.

Figure 7:
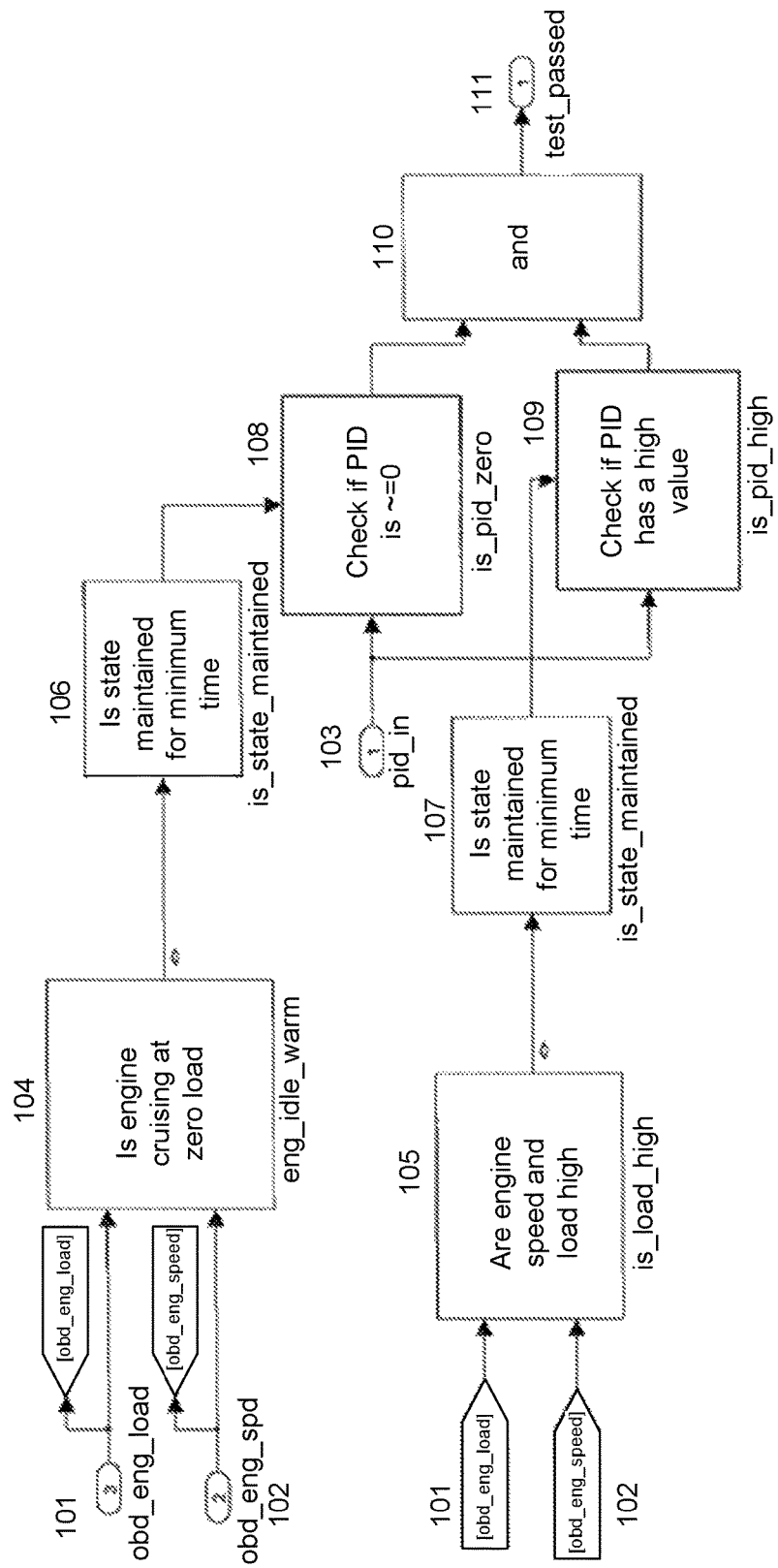
FIG. 7 shows a module for identifying the desired fuel PID by studying extremes of behavior, in accordance with another embodiment.

FIG. 7 shows a module for identifying the desired fuel PID by studying extremes of behavior, in accordance with another embodiment. There are three inputs including the engine load 101, the engine speed 102 and the PID value 103. The engine load and the engine speed are industry standard mode 1 PIDs and hence can be used for reliably identifying other PIDs. The engine load and engine speed

TABLE 5

| PID | Bytes Received | Latest Value | Min | Max | Filtered Average | Rate | Confirmed role |
| --- | --- | --- | --- | --- | --- | --- | --- |
| 0x000C | 1 | 800 | 0 | 5238 | 977 | FAST | ENG_RPM |
| 0x17FE | 4 | 0 | 0 | 0 | 0 | SLOW | UNVALIDATED |
| 0x2338 | 2 | 43 | 3 | 97 | 21 | FAST | ENG_LOAD |
| 0x3FFE | ERROR | 0 | 0 | 0 | 0 | SLOW | UNVALIDATED | are fed into two modules, "eng_idle_warm" 104 and "is_load_high" 105. These modules check for the conditions outlined in (i) and (ii) above respectively. A check is made for each that the condition has been made for a minimum time period ("is_state_maintained?" 106, 107). Then, if the relevant behavior of the vehicle is being observed, checks are made on the value of the PID. If both "is_pid_zero?" 108 and "is_pid_high?" 109 have given logical one readings at appropriate periods of time, then AND gate 110 will give an output indicating that the test has been passed and that the PID is likely to be the "desired fuel."

Figure 8:
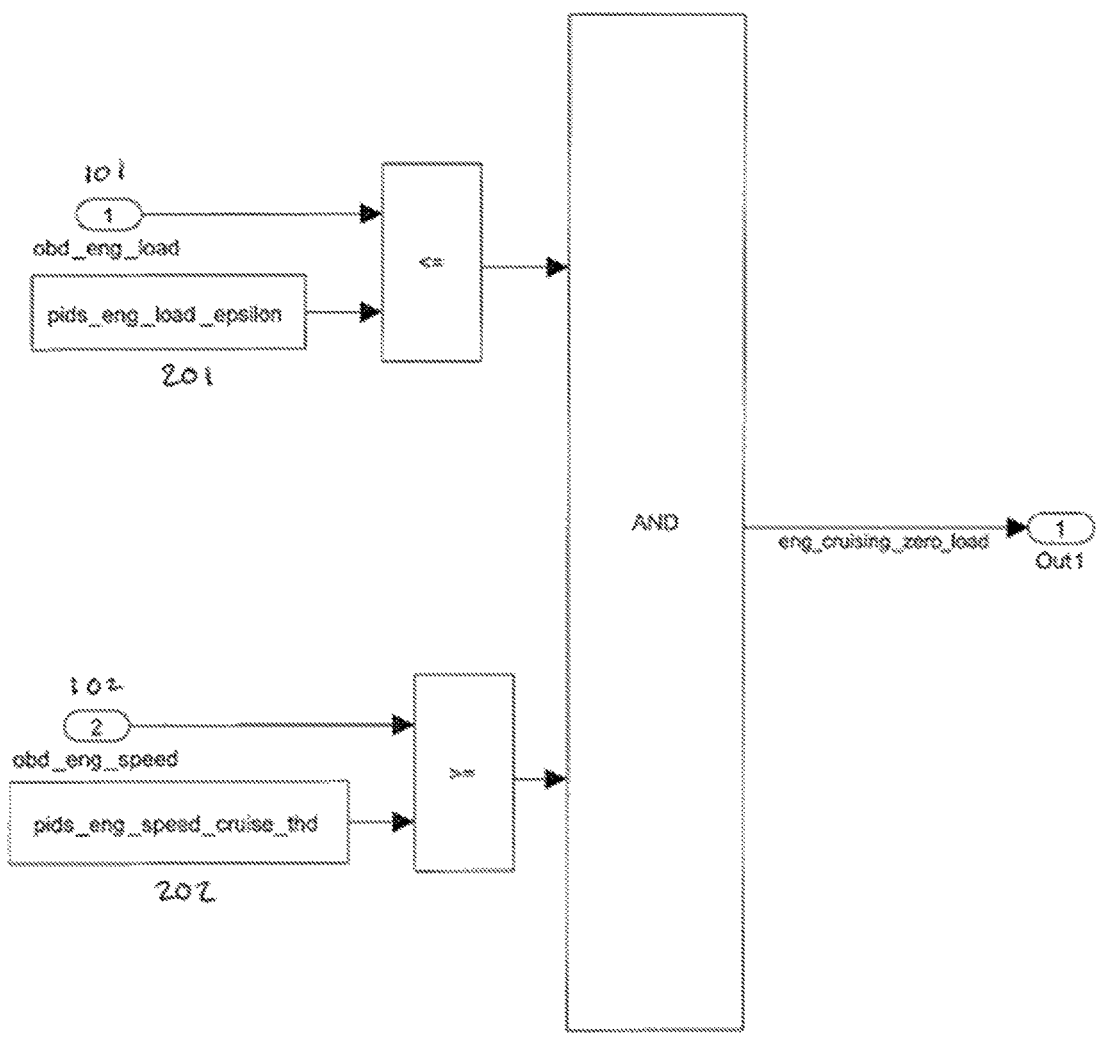
FIG. 8 illustrates an "engine_idle_warm" module, in which engine load is compared with a threshold, in accordance with another embodiment.

FIG. 8 illustrates an "engine_idle_warm" module, in which the engine load 101 is compared with a threshold 201 and the engine speed 102 is compared with a cruising speed threshold 202. If the engine load is less than the threshold, which indicates that its value is close to zero, and the engine speed is above the cruising threshold, this is used as an indication that the vehicle is decelerating in gear at zero load and a check can then be made to see if a PID is near zero for identification of the desired fuel PID.

Figure 9:
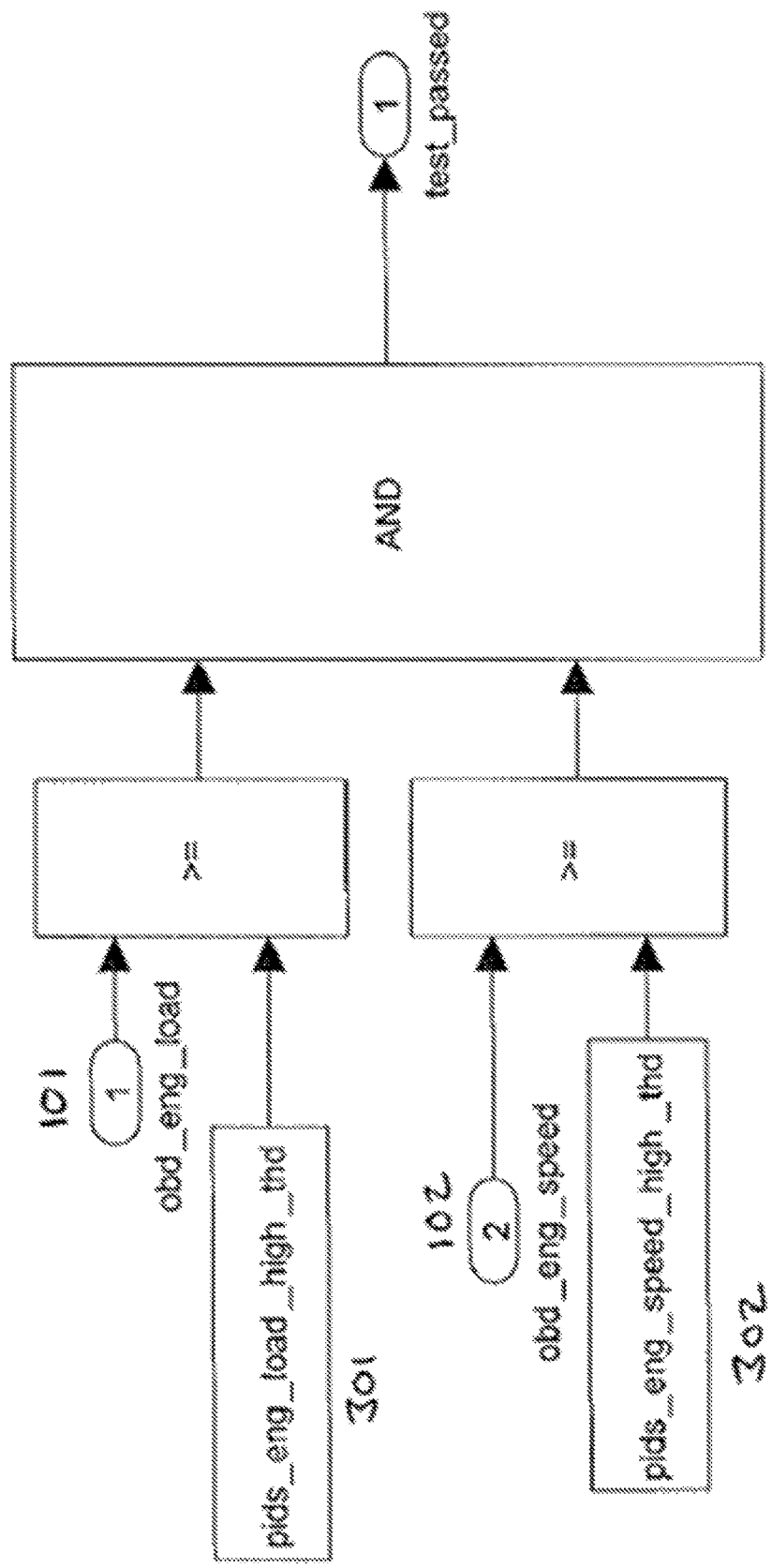
FIG. 9 illustrates an "is_load_high" module, in accordance with another embodiment.

FIG. 9 illustrates an "is_load_high" module, which receives engine load 101 and engine speed 102 as inputs and checks whether both are above certain thresholds. If the engine load and engine speed are both high (301, 302), then a logical one output indicates that a period where desired fuel should be high has been reached, allowing the PIDs to be checked for this behavior. In addition to the checks at cruising and at high load, minimum, maximum, percentage of zero values and the mean value of a PID may be recorded for identification of the desired fuel PID.

Figure 10:
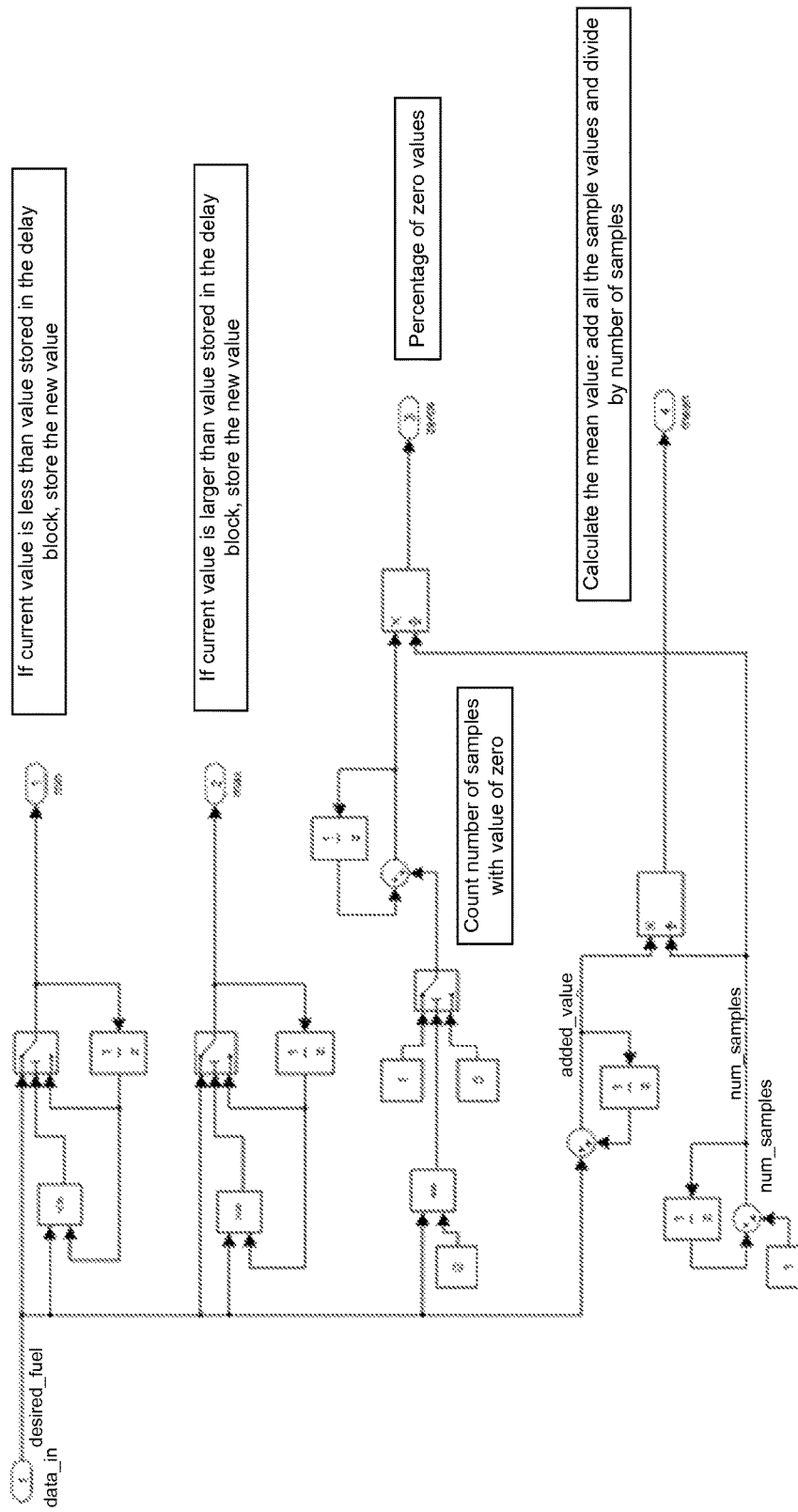
FIG. 10 shows a circuit for processing and implementing PID data, in accordance with one or more embodiments.

FIG. 10 shows a circuit for processing and implementing PID data, in accordance with one or more embodiments (and as may be implemented with one or more of FIGS. 6-9 above). The first branch of FIG. 10 records the minimum value of the incoming data, by comparing it with the previously stored lowest value. The second branch finds the maximum occurring value by similar means. The third branch keeps a record of the number of zero values and outputs this divided by the total number of samples. Finally, the fourth branch calculates a running average of the PID sample values. All of these outputs may be compared with expected values for desired fuel in order to decide which PID corresponds to this variable.

Another embodiment is directed to ascertaining information such as fuel use and driver behavior using engine torque. A PID is evaluated to determine whether it characterizes engine torque as follows. If the engine is idling and warm, the engine torque at crankshaft must be zero. The engine must be warm since a temperature dependant offset is normally used when calculating engine torque. In the model, the state "Idling and warm" is active when engine speed is in the idle speed range and when the engine coolant temperature is above a threshold. If the engine speed and engine load are high, then the engine torque must also be high i.e. above a certain calibrated threshold.

Figure 11:
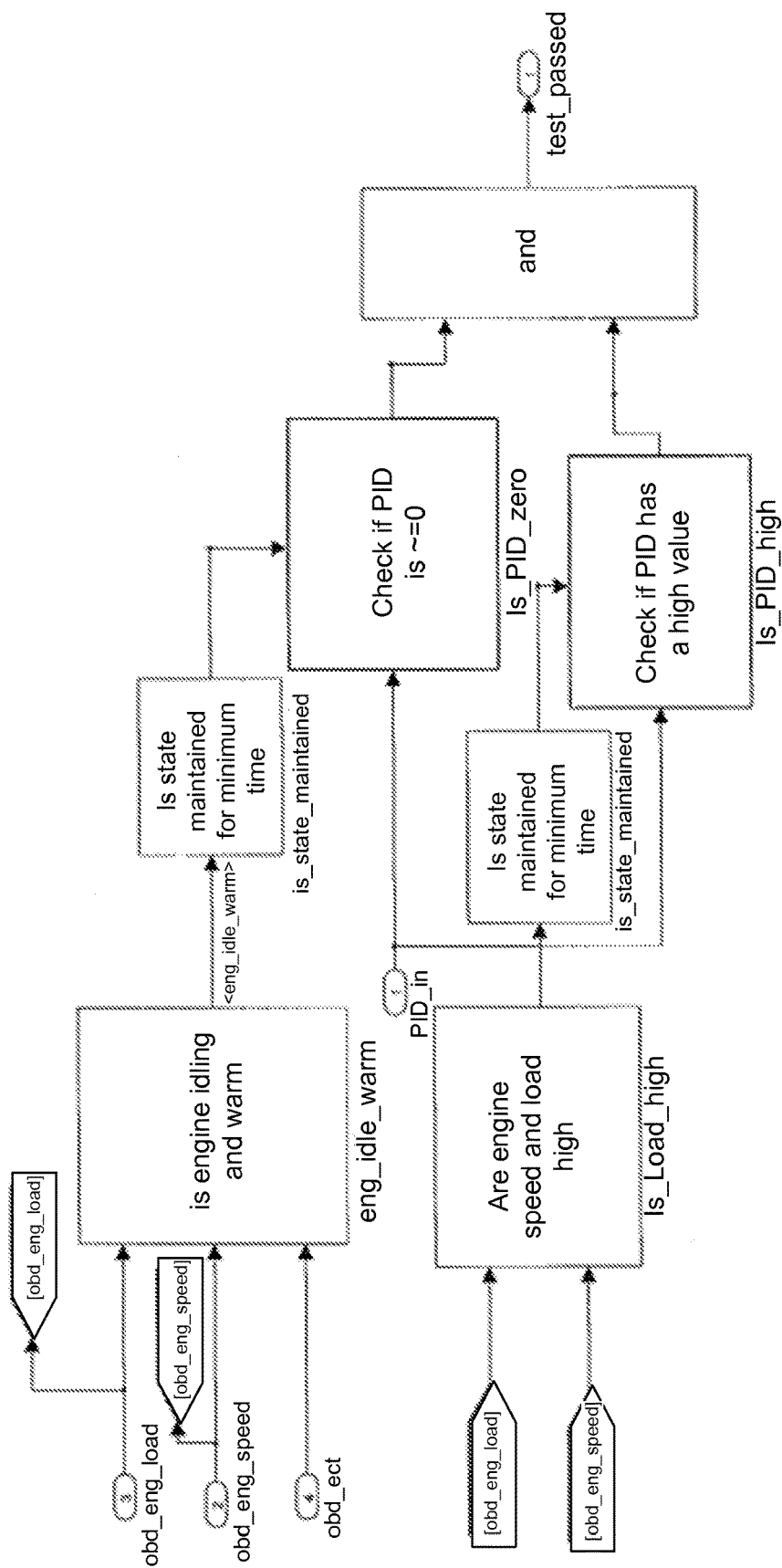
FIG. 11 illustrates a module for checking if a PID is the engine torque, in accordance with another embodiment.

FIG. 11 illustrates a module for checking if a PID is the engine torque, in accordance with another embodiment. It works in a manner very similar to the module for identifying the desired fuel PID. Here, however, instead of a module to identify a vehicle cruising at zero load, a "warm and idling" period identifying module is needed. For this, three inputs, the engine speed, engine load and the exhaust gas temperature (EGT) are needed. The EGT is an industry standard PID.

Figure 12:
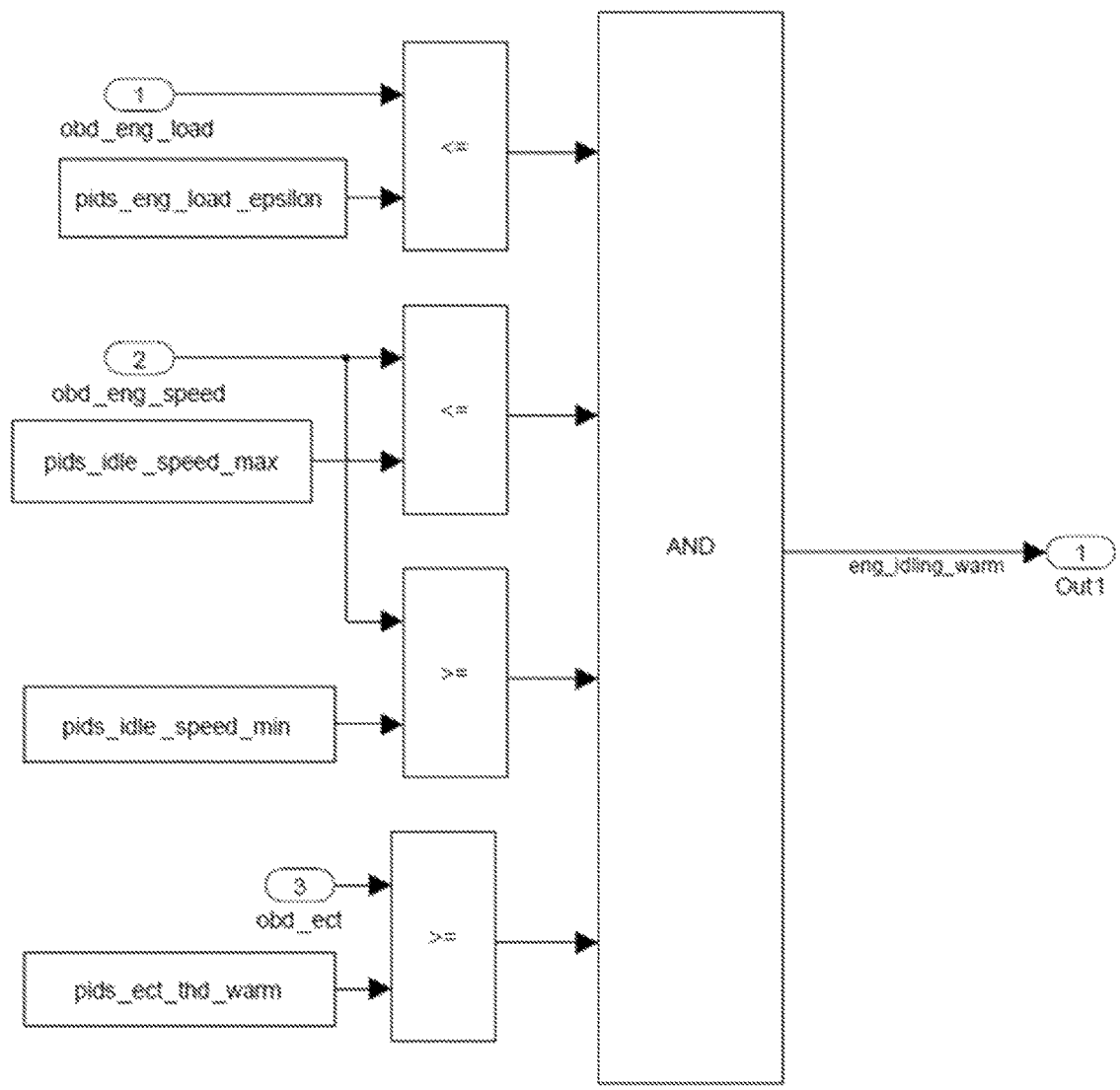
FIG. 12 shows an "Eng_idle_warm" module, in accordance with one or more embodiments.

Details of an "Eng_idle_warm" module, in accordance with one or more embodiments, are shown in FIG. 12. A check is made that the engine load is below a required threshold (pids_eng_load_epsilon) and that the engine speed is within a given range. The exhaust gas temperature is also checked to ensure it is above a given threshold (e.g., above which a degree of certainty is expected).

In various embodiments, an OBD module validates all of the available PIDs on the hotlist in parallel (actually on different timesteps) for each possible role, and also checks each PID against all possible roles it may have in parallel (on the same timestep). This approach facilitates efficiently identifying PIDs whose existence may be revealed only in particular circumstances (e.g., full load acceleration or zero-load coast-down). If 10 PIDs are used to validate against 10 roles, then all 100 permutations are covered each time the hotlist cycles round the 10 PIDs.

Figure 13:
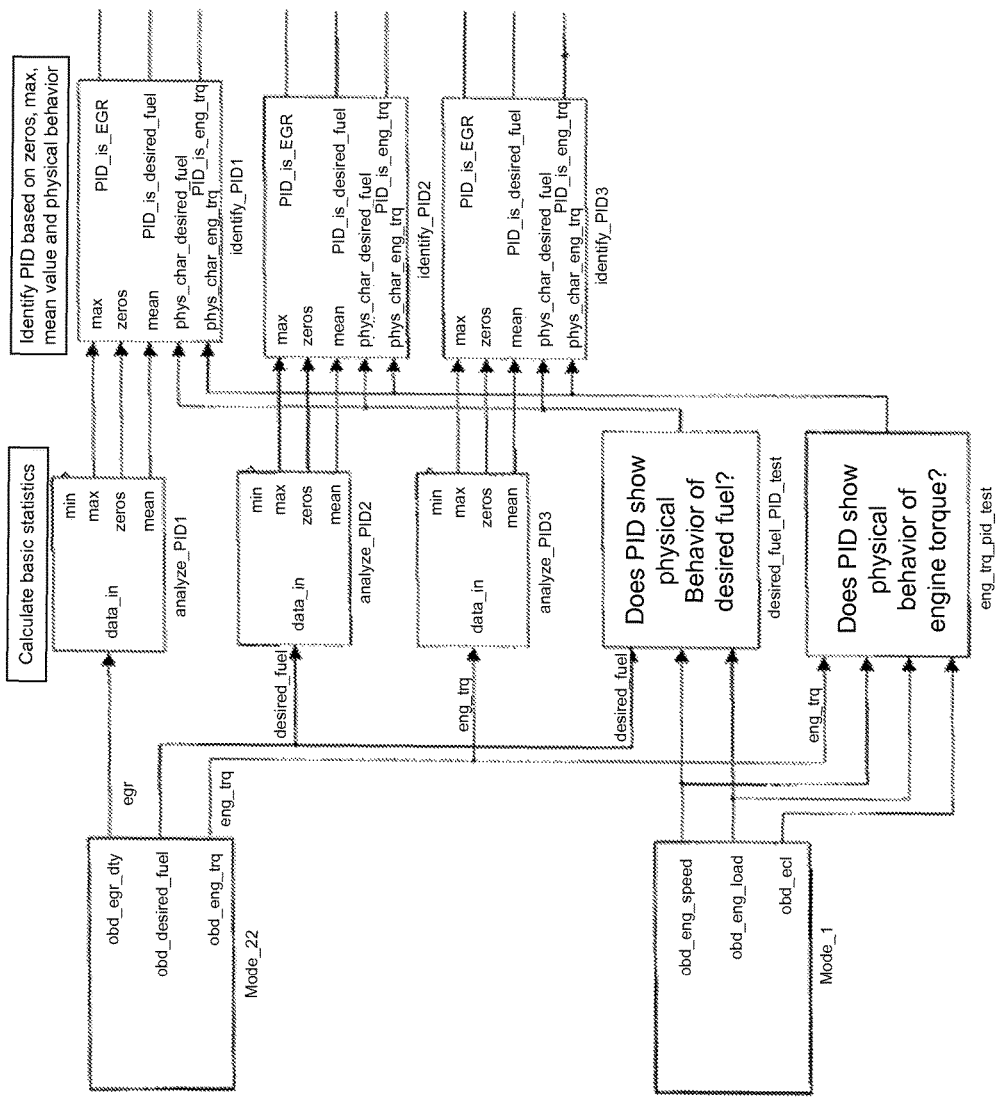
FIG. 13 illustrates an embodiment directed to processing of PIDs to identify an exhaust gas recirculation (EGR), desired fuel or engine torque PID, in accordance with another embodiment.

FIG. 13 illustrates an embodiment directed to processing three different PIDs to find which of them is the exhaust gas recirculation (EGR), desired fuel or engine torque. Initial statistics are calculated from each PID, from which the PIDs are identified using zeros, max and mean values, as well as physical behavior (with fuel use and engine torque shown, and other such behavior aspects implemented in connection with other example embodiments).

Other embodiments implement scaling approaches tailored to particular manufacturers, with different manufactures using different scaling for different PIDs. The scaling is used to determine the range of values used by the PID. A more particular embodiment is directed to ascertaining this scaling using if-else logic to identify the scaling and pass the scaled value of the PID onto a model. A particular PID can be sent as a one byte value or a two byte value or a multiple byte value. All likely or possible scaling can be ascertained for a quantity. Pseudo-code for an example scaling algorithm is shown below:

```
IF (PID value has 1 byte),
  THEN
    {
      Assume 1st possible scaling and validate PID;
      IF (PID not valid),
      THEN Assume 2nd possible scaling and validate PID;
      IF(PID again not valid),
      THEN Assume 3rd possible scaling
   ......
      IF( PID not validated with all any scaling)
      THEN PID set to invalid;
    }
elseif (PID value has 2 bytes)
  THEN
    {
      Assume 1st possible scaling and validate PID;
      IF (PID not valid),
      THEN Assume 2nd possible scaling and validate PID;
      IF(PID again not valid),
      THEN Assume 3rd possible scaling
   ......
      IF( PID not validated with all any scaling)
      THEN PID set to invalid;
    }
```

A variety of other approaches as may be implemented with one or more embodiments as described herein and/or in the priority documents to which this patent document claims benefit. Some embodiments are directed to an onboard system for determining an accurate prediction of actual fuel used. The prediction is determined in real time and may be transmitted to a remote terminal for storage and/or analysis. In certain implementations, data is supplied solely to an emissions unit from a vehicle diagnostic system that receives vehicle data from vehicle systems and sub-systems (e.g., thus facilitating the prediction based upon information provided by internal vehicle systems/sub-systems without necessarily directly contacting/communicating with these systems, such as described in connection with ascertaining PIDs herein).

In various embodiments, the prediction of fuel used is used to determine a characteristic of driver performance or behavior. For example, predetermined relationships and/or data lookup table type information can be used to infer characteristics of driver behavior based upon predicted fuel used, which can further be used to facilitate driver training. In some embodiments, this training is facilitated by storing and/or communicating data characterizing driver behavior for use in evaluating or providing feedback at a later time. In other embodiments, this training is facilitating by providing real-time feedback to the driver. Such real-time feedback may involve, for example, informing the driver of excessive fuel use, and/or providing a suggested corrective action regarding the vehicle (e.g., shifting gears, suggested throttle action).

In other embodiments, a prediction of fuel used as discussed above is used to assess a driver incident risk. This assessment may be made, for example, by comparing ascertained fuel use data, which may also be combined with other data (e.g., speed, location) to data characterizing driver risk. For instance, rapid acceleration and high-speed driving may result in higher fuel use, which can be used to ascertain a driving style. Such information may be provided for use in assessing such risk for insurance purposes. For instance, drivers wishing to obtain a lower rate of insurance may be amenable to the installation of a device that draws information from a vehicle's OBD port; such information is obtained and communicated for assessment of the driver's driving style. This information can be used to assess the driver's risk of accident, such as by using the information as an indication of driver stress and behavior, and thus be used to automatically calculate a driver risk rate for insurance purposes.

The rate at which the vehicle emissions are computed needs careful consideration. If it is too slow, transient conditions where high emissions are likely may be missed. As the OBD port provides data-updates fairly slowly (a few samples per second) then there is little value in calculating the emissions value at a significantly greater rate than this. Thus, in the context of the present invention, real-time determination of vehicle emissions may be interpreted to mean that an emissions value is determined at least once a second, or approximately 10 times per second.

Various modules may be implemented to carry out one or more of the operations and activities described herein and/or shown in the figures. In these contexts, a "module" is a circuit that carries out one or more of these or related operations/activities (e.g., using data to identify a PID, characterizing vehicle operation, and/or determining a driver input characteristic). For example, in certain of the above-discussed embodiments, one or more modules are discrete logic circuits or programmable logic circuits configured and arranged for implementing these operations/activities, as in the circuit modules shown in FIGS. 2, 3 and 6-12. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Figure 14:
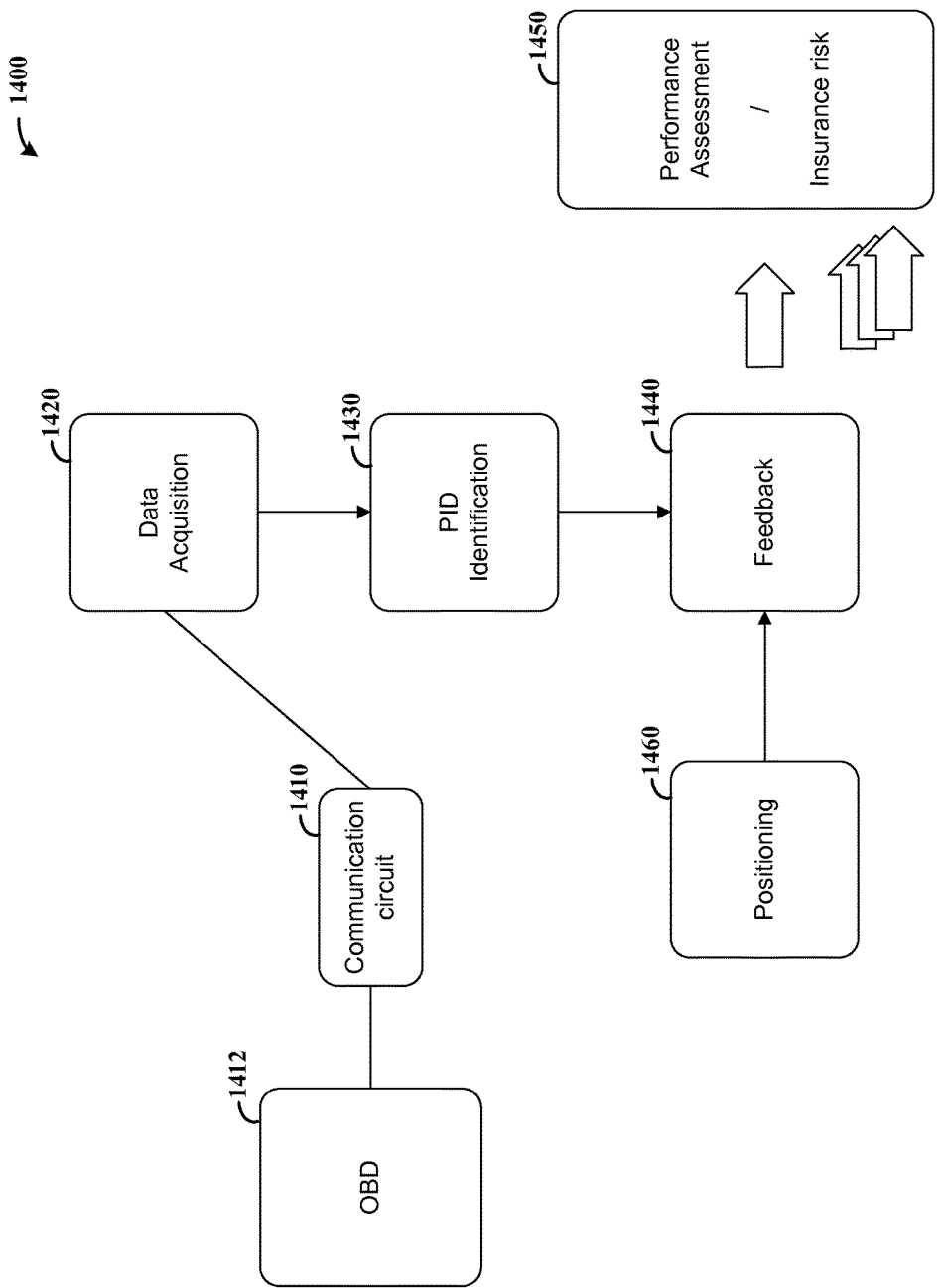
FIG. 14 shows a driver input feedback apparatus, in accordance with another embodiment.

Certain embodiments are directed to a computer program product (e.g., nonvolatile memory device), which includes a machine or computer-readable medium having stored thereon instructions which may be executed by a computer (or other electronic device) to perform these operations/activities FIG. 14 shows an apparatus 1400 having a communication circuit 1410, a data acquisition module 1420, a PID identification module 1430 and a feedback module 1440, in accordance with another embodiment. The communication circuit 1410 couples to and communicates with a vehicle on board diagnostics (OBD) circuit 1412, and the data acquisition module 1420 acquires data from signals received via the communication circuit and generated by the OBD, with the signals including parameter indicators (PIDs). The PID identification module 1430 uses the data acquired by the data acquisition module to identify at least one PID that characterizes vehicle operation. The feedback module 1440 generates data that characterizes vehicle operation based upon the at least one PID and the acquired data, and determines a driver input characteristic of the vehicle being driven based upon the data that characterizes vehicle operation.

In some embodiments, the apparatus is implemented in connection with FIGS. 2-4, with certain aspects implemented with one or more other figures (e.g., the PID identification module may be implemented using an approach such as that shown in FIG. 13). In addition, the data generated by the feedback module may be used/output in a variety of manners as consistent with these and other figures, and/or with an embodiment as further shown in FIG. 14 in which the output is wirelessly communicated to a remote performance assessment module 1450, that assesses driver performance specific to the feedback module 1440 and to a plurality of other feedback modules in different vehicles. The performance assessment module 1450 generates an output indicative of driver performance for each of the feedback modules, based upon the driver input characteristics determined by the respective feedback modules. Such an output may, for example, effect a comparison of driver behavior (e.g., good and bad driving performance/habits), as may relate to risky driving behavior such as rapid acceleration, rapid braking, engine speed and other characteristics ascertained via the communication circuit 1410. In some embodiments, this risk information is correlated to an insurance-based risk and used to assign a value (e.g., a weighting value) to the respective modules (and, correspondingly, to drivers operating vehicles in which the modules are employed). One or more driver behaviors can be so assessed and implemented in assessing risk. In certain implementations, the performance assessment module 1450 generates an insurance risk output, based on data received from the feedback circuit 1440 (e.g., by processing driver input characteristics with data that correlates/uses the characteristics to provide an indication of insurance risk).

The feedback module 1440 determines driver input characteristics in one or more of a variety of manners. In some embodiments, the feedback module 1440 determines an input characteristic indicative of driver performance based upon data that characterizes vehicle operation and stored data correlating vehicle operation to driver performance (e.g., the feedback module 1440 includes and/or accesses a data storage circuit in this context). In other embodiments, the feedback module 1440 determines an input characteristic indicative of driver risk based upon the data that characterizes at least one of torque, throttle angle, engine temperature, vehicle braking, vehicle speed and fuel consumption for the vehicle, and based upon stored data correlating the at least one of torque and fuel consumption to driver risk. In certain embodiments, the feedback module 1440 and/or the performance assessment module 1450 determines an insurance risk metric using the driver input characteristic(s) with insurance-based data correlating the driver input characteristic with the insurance risk metric.

In some embodiments, the feedback module 1440 generates data that characterizes vehicle operation based upon the PID and acquired data by obtaining scaling data specific to the vehicle. The scaling data is used to decode the acquired data for the PID.

In some embodiments, the feedback module 1440 populates an array and/or a matrix with the identified PID. Such information can be used with a model of the operation of the vehicle indicative of driver input-based safety risk characteristics. The operation of the vehicle is matched with the safety risk characteristics, as characterized by the at least one PID with the model (e.g., with a computer processing matrices of information together with a correlation between vehicle data such as throttle position, braking, airbag deployment and acceleration, with risk characteristics). In some instances in which insufficient data is obtained (e.g., for filling such a matrix), predefined data is used with the acquired data and a model of operation of the vehicle, to provide inputs to the model for inputs not ascertained in the acquired data.

In still other embodiments, the feedback module 1440 generates data that characterizes vehicle operation using stored data that changes based upon at least one of a number of miles and a time in which the vehicle is in service. With this approach, changes in acquired data that relate to vehicle age can be accounted for in ascertaining user operation characteristics.

The PID identification module 1430 identifies at least one PID based on communications received via the communication circuit 1410 in a variety of manners, such as those described herein. In some embodiments, the PID identification module 1430 uses look-up tables and/or intuitive model data including data relating a plurality of types of OBD circuits to identify a specific type of OBD circuit to which the communication circuit 1410 is coupled. Once the type of OBD circuit is identified, that type is used to identify the at least one PID. In certain embodiments, the feedback module 1440 directs a driver of the vehicle to operate the vehicle using a particular driver input to facilitate the identification of the at least one PID by the PID identification module. In some implementations, the feedback module 1440 operates during operation of the vehicle (and on-board the vehicle) to calculate at least one of fuel consumption data and torque data using the identified PID in real time, using the PID data and the data obtained from the diagnostic system. The data is made available at the vehicle in real time to provide feedback to a driver of the vehicle indicative of a driving characteristic.

In some embodiments, the PID identification module 1430 identifies a plurality of PIDs that can be used to characterize vehicle operation corresponding to a safety risk-based driver input. The feedback module 1440 use a vehicle operation model that uses the plurality of PIDs to generate data that characterizes a safety-based driver input characteristic.

In various embodiments, two or more of the respective circuits/modules as shown in FIG. 14 may be implemented together, and functionality described in connection with one module may be implemented with another. For instance, one embodiment is directed to an on-board circuit device including the communication circuit 1410, data acquisition module 1420, PID identification module 1430 and feedback module 1440. The communication circuit 1410 is connected to an OBD port in the vehicle, and the feedback module 1440 provides feedback to one or more of a driver in the vehicle (e.g., via a visual or audio prompt) and a remote device such as the performance assessment module 1450.

In some implementations, such an on-board circuit device communicates with a remote device 1450 to relate a position of the vehicle, using a positioning module 1460 that provides a position output indicative of a position of the vehicle. This positioning information can be used to ascertain aspects of driver behavior. In one implementation, the feedback module 1440 determines the driver input characteristic using the position output. In another implementation, the positioning information is provided to the performance assessment module 1450, which uses the information to ascertain aspects about driver behavior (e.g., when a GPS positioning module indicates that a driver is travelling on a road having a steep incline, driver input characteristics such as throttle position are processed accordingly, such as by noting such characteristics are indicative of normal uphill travel rather than excessive throttle).

It will be readily understood that the present invention may be used with any type of vehicle having an internal combustion engine and also with other internal combustion engines.

The invention claimed is:

1. An apparatus comprising:
   a communication circuit configured and arranged to couple to and communicate with a vehicle on board diagnostics (OBD) circuit that is connected to receive data from an engine control unit;
   a data acquisition module configured and arranged to acquire data from signals generated by the OBD circuit and received via the communication circuit;
   an identification module configured and arranged to use the data acquired by the data acquisition module to identify a plurality of variables that respectively characterize different operational characteristics of the vehicle as provided via the engine control unit; and
   a feedback module configured and arranged to
      generate data that characterizes vehicle operation based upon at least one of the variables and based upon the acquired data, and
      determine a driver input characteristic of the vehicle being driven based upon the data that characterizes vehicle operation.

2. The apparatus of claim 1, wherein the feedback module is configured and arranged to generate the data that characterizes the vehicle operation by processing at least one of the variables as inputs with a model of the operation of the vehicle, and therein outputting the data that characterizes the vehicle operation.

3. The apparatus of claim 1, wherein the feedback module is configured and arranged to generate the data that characterizes the vehicle operation by matching operation of the vehicle as characterized by the variables with a model of the operation of the vehicle.

4. The apparatus of claim 1, wherein the feedback module is configured and arranged to generate the data that characterizes the vehicle operation by:
   accessing at least one of the variables from a data storage circuit, and executing a model of the operation of the vehicle using at least one of the accessed variables as input, and therein generating the data that characterizes the vehicle operation.

5. The apparatus of claim 1, wherein the feedback module is configured and arranged to generate the data that characterizes the vehicle operation by:
populating at least one of an array and a matrix with the at least one of the variables, and
using the at least one of the array and matrix together with a model of the operation of the vehicle indicative of driver input-based safety risk characteristics, matching operation of the vehicle as characterized by the at least one of the variables with the model.

6. The apparatus of claim 1, wherein
the data acquisition module is configured and arranged to operate with the OBD circuit to request data, using an OBD protocol, from a particular vehicle sensor coupled to the engine control unit, and
the identification module is configured and arranged to identify the variables by identifying a variable that corresponds to the data obtained, by the engine control unit, from the particular vehicle sensor communicatively coupled to the engine control unit.

7. The apparatus of claim 1, wherein the identification module is configured and arranged to identify the variables by identifying a variable that represents bit-mapped state information for a particular vehicle sensor communicatively coupled to the engine control unit, the bit-mapped state information being provided via the engine control unit.

8. The apparatus of claim 1, wherein the identification module is configured and arranged to identify variables that characterize different operational characteristics of different vehicles having respective types of OBD circuits by, for each vehicle, identifying a variable that corresponds to data obtained, by the engine control unit, from a particular vehicle sensor communicatively coupled to the engine control unit, based upon the type of OBD circuit.

9. The apparatus of claim 1, wherein the feedback module is configured and arranged to determine the driver input characteristic by determining an input characteristic indicative of driver performance based upon the data that characterizes vehicle operation and stored data correlating vehicle operation to driver performance.

10. The apparatus of claim 1, wherein the feedback module is configured and arranged to determine the driver input characteristic by determining an input characteristic indicative of driver input-based safety risk characteristics, based upon the data that characterizes vehicle operation and stored data correlating vehicle operation to driver input-based safety risk characteristics.

11. The apparatus of claim 1, wherein the feedback module is configured and arranged to determine the driver input characteristic by determining an input characteristic indicative of driver risk based upon aspects of the acquired data that characterize at least one of torque, throttle angle, engine temperature, vehicle braking, vehicle speed and fuel consumption for the vehicle, and based upon stored data correlating the at least one of torque and fuel consumption to driver risk.

12. The apparatus of claim 1, wherein the feedback module is configured and arranged to determine an insurance risk metric, using the determined driver input characteristic with insurance-based data that correlates the driver input characteristic with the insurance risk metric.

13. An apparatus comprising:
means for acquiring data from signals generated by a vehicle on board diagnostics (OBD) circuit that is connected to receive data from an engine control unit;
means for identifying, using the acquired data, a plurality of variables that respectively characterize different operational characteristics of the vehicle as provided via the engine control unit; and
means for generating data that characterizes vehicle operation based upon at least one of the variables and based upon the acquired data, and
means for determining a driver input characteristic of the vehicle being driven based upon the data that characterizes vehicle operation.

14. The apparatus of claim 13, wherein:
the means for generating data includes means for populating at least one of an array and a matrix with the at least one of the variables, and
the means for determining the driver input characteristic includes means for, using the at least one of the array and matrix together with a model of the operation of the vehicle indicative of driver input-based safety risk characteristics, matching operation of the vehicle as characterized by the at least one of the variables with the model.

15. A method comprising
acquiring data from signals generated by a vehicle on board diagnostics (OBD) circuit that is connected to receive data from an engine control unit;
using the acquired data, identifying a plurality of variables that respectively characterize different operational characteristics of the vehicle as provided via the engine control unit;
generating data that characterizes vehicle operation based upon at least one of the variables and the acquired data; and
determining a driver input characteristic of the vehicle being driven based upon the generated data that characterizes vehicle operation.

16. The method of claim 15, wherein generating the data that characterizes the vehicle operation includes processing at least one of the variables as inputs with a model of the operation of the vehicle, and therein outputting the data that characterizes the vehicle operation.

17. The method of claim 15 wherein generating the data that characterizes the vehicle operation includes matching operation of the vehicle as characterized by the variables with a model of the operation of the vehicle.

18. The method of claim 15, further comprising:
populating at least one of an array and a matrix with the at least one of the variables, and
using the at least one of the array and matrix together with a model of the operation of the vehicle indicative of driver input-based safety risk characteristics, matching operation of the vehicle as characterized by the at least one of the variables with the model.

19. The method of claim 15,
further including obtaining data, via the OBD circuit and the engine control unit, from a particular vehicle sensor communicatively coupled to the engine control unit, using communications between the OBD circuit and the engine control unit in accordance with an OBD protocol to cause the engine control unit to provide the data from the particular vehicle sensor, and
wherein identifying the plurality of variables includes identifying a variable that corresponds to the obtained data.

20. The method of claim 15, wherein identifying the plurality of variables includes identifying a variable that represents bit-mapped state information for a particular vehicle sensor communicatively coupled to the engine control unit, the bit-mapped state information being provided via the engine control unit.

21. The method of claim 15, wherein determining the driver input characteristic of the vehicle includes determining a driver input characteristic selected from the group consisting of: driver performance, driver risk, and a combination of driver performance and driver risk.

22. An apparatus comprising:
a non-transitory electronically readable medium having stored instructions that, when executed by a processor, cause the processor to perform steps including
acquiring data from signals generated by a vehicle on board diagnostics (OBD) circuit that is connected to receive data from an engine control unit;
using the acquired data, identifying a plurality of variables that respectively characterize different operational characteristics of the vehicle as provided via the engine control unit;
generating data that characterizes vehicle operation based upon at least one of the variables and the acquired data; and
determining a driver input characteristic of the vehicle being driven based upon the data that characterizes vehicle operation.

\* \* \* \* \*